(12) United States Patent
Crossman et al.

(10) Patent No.: US 12,447,425 B2
(45) Date of Patent: Oct. 21, 2025

(54) TANK INLET FILTERS

(71) Applicant: Rain Harvesting Pty Ltd, Milton (AU)

(72) Inventors: Shaun Crossman, Milton (AU); Anton Lee See, Milton (AU)

(73) Assignee: RAIN HARVESTING PTY LTD, Milton (AU)

( * ) Notice: Subject to any disclaimer, the term of this patent is extended or adjusted under 35 U.S.C. 154(b) by 372 days.

(21) Appl. No.: 18/255,642

(22) PCT Filed: Dec. 3, 2021

(86) PCT No.: PCT/AU2021/051447
§ 371 (c)(1),
(2) Date: Jun. 2, 2023

(87) PCT Pub. No.: WO2022/115918
PCT Pub. Date: Jun. 9, 2022

(65) Prior Publication Data
US 2023/0415077 A1      Dec. 28, 2023

(30) Foreign Application Priority Data

Dec. 4, 2020   (AU) ............................... 2020904502

(51) Int. Cl.
*B01D 35/027*      (2006.01)
*B01D 29/35*       (2006.01)
(Continued)

(52) U.S. Cl.
CPC ......... *B01D 35/0276* (2013.01); *B01D 29/35* (2013.01); *B65D 88/54* (2013.01);
(Continued)

(58) Field of Classification Search
None
See application file for complete search history.

(56) References Cited

U.S. PATENT DOCUMENTS

| 242,962 A | * | 6/1881 | Newton | ................. | A47J 31/14 |
| | | | | | 222/189.01 |
| 321,877 A | * | 7/1885 | Abell | .................... | B01D 35/28 |
| | | | | | 141/331 |

(Continued)

FOREIGN PATENT DOCUMENTS

| AU | 2020275957 A1 | * | 12/2021 | ............. H02G 3/083 |
| AU | 2021393371 A1 | * | 6/2023 | ......... B01D 35/0276 |

(Continued)

OTHER PUBLICATIONS

YouTube Video—"High Flow Filter Basket & Light Guard for Rainwater Collection Tank", [Viewed on Internet on Dec. 2, 2022], published by Rainwater Equipment LLC, published on Jan. 6, 2020.

(Continued)

*Primary Examiner* — Robert J Popovics
(74) *Attorney, Agent, or Firm* — DUANE MORRIS LLP

(57) ABSTRACT

A tank screen (10) having at least one contact region or contact area (14) for positioning the tank screen relative to a tank inlet, a solid wall (16) having a portion extending above the at least one contact area or contact region (14), and a mesh screen (18) for filtering leaves from water entering the rainwater tank, the mesh screen (18)comprising a mesh side wall (20) that has an upper region located above the at least one contact area or contact region (14), the at least the upper region of the mesh sidewall (20) being at least partly enclosed by the solid sidewall (16).

14 Claims, 13 Drawing Sheets

(51) Int. Cl.
*B65D 88/54* (2006.01)
*C02F 1/00* (2023.01)
*C02F 103/00* (2006.01)

(52) U.S. Cl.
CPC .......... *C02F 1/001* (2013.01); *B01D 2201/02* (2013.01); *C02F 2103/001* (2013.01)

(56) References Cited

U.S. PATENT DOCUMENTS

| | | | | | |
|---|---|---|---|---|---|
| 356,555 | A * | 1/1887 | Ryan | ................ | B01D 35/0276 210/474 |
| 370,141 | A * | 9/1887 | Hobbs | ................ | C02F 1/003 210/244 |
| 370,275 | A * | 9/1887 | Mendenhall | ................ | A01J 11/14 210/474 |
| 419,551 | A * | 1/1890 | Philley | ................ | A01J 9/02 210/482 |
| 433,659 | A * | 8/1890 | Schermerhorn | ................ | A01J 11/06 210/338 |
| 439,185 | A * | 10/1890 | Polka | ................ | B01D 35/027 4/293 |
| 462,076 | A * | 10/1891 | Devoll | ................ | A47J 43/22 210/474 |
| 493,965 | A * | 3/1893 | Bowman | ................ | B01D 35/027 210/172.6 |
| 500,094 | A * | 6/1893 | Bennett | ................ | B01D 35/027 210/477 |
| 513,893 | A * | 1/1894 | Davenport | ................ | A47J 31/14 210/463 |
| 520,168 | A * | 5/1894 | Postlethwaite | ................ | B01D 29/111 210/473 |
| 526,637 | A * | 9/1894 | Ryan | ................ | C02F 3/06 99/452 |
| 743,091 | A * | 11/1903 | Loop | ................ | B01D 35/02 210/312 |
| 752,019 | A * | 2/1904 | Adwen | ................ | B01D 35/30 210/474 |
| 789,062 | A * | 5/1905 | Prescott | ................ | A01J 11/08 210/489 |
| 807,286 | A * | 12/1905 | King | ................ | B60K 15/0406 220/301 |
| 1,015,946 | A * | 1/1912 | Ebner | ................ | E04D 13/076 210/474 |
| 1,031,015 | A * | 7/1912 | Lundguard | ................ | A47J 36/08 220/372 |
| 1,051,735 | A * | 1/1913 | Hammond | ................ | A01J 1/00 210/474 |
| 1,059,935 | A * | 4/1913 | Guderian | ................ | C02F 1/001 210/451 |
| 1,062,650 | A * | 5/1913 | Hudson | ................ | A01J 1/00 210/314 |
| 1,115,016 | A * | 10/1914 | Pheils | ................ | B65F 1/1447 193/11 |
| 1,155,070 | A * | 9/1915 | Kessler | ................ | B60K 15/04 210/172.6 |
| 1,177,277 | A * | 3/1916 | Schaub | ................ | B01D 35/027 210/473 |
| 1,217,732 | A * | 2/1917 | Fedders | ................ | F28D 1/0358 210/172.6 |
| 1,218,975 | A * | 3/1917 | Brison | ................ | B01D 29/15 210/462 |
| 1,224,009 | A * | 4/1917 | Niemann | ................ | A01J 9/02 210/306 |
| 1,283,384 | A * | 10/1918 | Weil | ................ | B65D 83/687 222/542 |
| 1,415,217 | A * | 5/1922 | Brock | ................ | B60K 15/04 210/473 |
| 1,436,294 | A * | 11/1922 | Scott | ................ | B60K 15/0406 210/473 |
| 1,451,136 | A * | 4/1923 | Allnutt | ................ | F01P 11/0214 137/526 |
| 1,451,206 | A * | 4/1923 | Dow | ................ | A47J 43/22 210/473 |
| 1,460,613 | A * | 7/1923 | Sill | ................ | E03B 3/02 251/294 |
| 1,536,890 | A * | 5/1925 | Lagemann | ................ | A01J 11/06 210/474 |
| 1,546,230 | A * | 7/1925 | Grover | ................ | A01J 9/00 220/372 |
| 1,553,395 | A * | 9/1925 | Ressler | ................ | A62C 4/00 210/172.6 |
| 1,570,461 | A * | 1/1926 | Cohn | ................ | A62C 4/00 220/88.2 |
| 1,581,947 | A * | 4/1926 | Hobbs | ................ | B01D 35/023 210/473 |
| 1,590,572 | A * | 6/1926 | Fredette | ................ | B44D 3/10 401/121 |
| 1,592,018 | A * | 7/1926 | Villers | ................ | A01J 9/02 210/482 |
| 1,596,362 | A * | 8/1926 | Mcdonald | ................ | B01D 35/023 210/305 |
| 1,599,835 | A * | 9/1926 | Nelson | ................ | A01J 11/06 210/474 |
| 1,604,048 | A * | 10/1926 | Hobbs | ................ | B01D 35/023 210/172.6 |
| 1,641,051 | A * | 8/1927 | Rheney | ................ | B65D 25/42 210/244 |
| 1,665,494 | A * | 4/1928 | Dillon | ................ | B01D 17/10 210/312 |
| RE16,994 | E * | 6/1928 | Cohn | ................ | F16K 24/04 210/172.6 |
| 1,677,118 | A * | 7/1928 | Ford | ................ | B01D 29/23 210/473 |
| 1,711,093 | A * | 4/1929 | Helman | ................ | B01D 35/023 210/463 |
| 1,715,601 | A * | 6/1929 | Davis | ................ | A01J 11/08 292/256.65 |
| 1,742,964 | A * | 1/1930 | Mcnally | ................ | A01J 11/06 210/463 |
| 1,767,269 | A * | 6/1930 | Westerberg | ................ | A01J 9/02 210/474 |
| 1,806,293 | A * | 5/1931 | Kornel | ................ | F02M 25/028 261/126 |
| 1,814,656 | A * | 7/1931 | Anschicks | ................ | B65D 25/385 210/172.6 |
| 1,933,486 | A * | 10/1933 | Essendon | ................ | A62C 4/00 220/86.3 |
| 1,976,975 | A * | 10/1934 | Williams | ................ | B60K 15/0406 220/86.3 |
| 2,010,445 | A * | 8/1935 | Randall | ................ | B60K 15/04 220/86.3 |
| 2,015,087 | A * | 9/1935 | Rafton | ................ | B07B 1/48 160/354 |
| 2,019,094 | A * | 10/1935 | Rice | ................ | B01D 35/02 210/497.3 |
| 2,070,998 | A * | 2/1937 | Odom | ................ | B44D 3/10 209/403 |
| 2,100,168 | A * | 11/1937 | Gordon | ................ | B65D 39/086 285/204 |
| 2,120,893 | A * | 6/1938 | Frushour | ................ | A01J 1/00 210/314 |
| 2,145,759 | A * | 1/1939 | Fellows | ................ | B60K 15/0403 210/172.6 |
| 2,172,031 | A * | 9/1939 | Morris | ................ | C02F 1/003 210/473 |
| 2,215,607 | A * | 9/1940 | Eastwood | ................ | A01J 9/02 220/372 |
| 2,239,132 | A * | 4/1941 | Ware | ................ | A01J 11/06 210/482 |
| 2,247,608 | A * | 7/1941 | De Groff | ................ | E03B 3/03 52/12 |
| 2,250,646 | A * | 7/1941 | Metsch | ................ | B07B 1/48 210/482 |
| 2,275,318 | A * | 3/1942 | Rasmussen | ................ | B65D 47/249 222/487 |
| 2,288,532 | A * | 6/1942 | Knapp | ................ | F16L 55/24 210/474 |

(56) References Cited

U.S. PATENT DOCUMENTS

| | | | | |
|---|---|---|---|---|
| 2,313,266 A * | 3/1943 | Roberts | B60K 15/0403 | 220/86.3 |
| 2,335,195 A * | 11/1943 | Packer | B65D 47/0876 | 222/469 |
| 2,351,526 A * | 6/1944 | Lebus | B60K 15/0406 | 210/172.6 |
| 2,379,735 A * | 7/1945 | Meikle | B60K 15/0406 | 220/86.3 |
| 2,471,189 A * | 5/1949 | Bartels | B65D 25/48 | 222/570 |
| 2,524,313 A * | 10/1950 | Gerling | B67D 7/42 | 210/309 |
| 2,625,270 A * | 1/1953 | De Armas | B44D 3/10 | 210/474 |
| 2,667,976 A * | 2/1954 | Weidner | B44D 3/10 | 210/469 |
| 2,733,775 A * | 2/1956 | Dupure | B01D 35/023 | 210/348 |
| 2,751,084 A * | 6/1956 | Wilhelm | B01D 29/902 | 210/473 |
| 2,753,051 A * | 7/1956 | Tupper | B65D 47/148 | 220/259.2 |
| 2,755,971 A * | 7/1956 | Lisciani | B01L 1/50 | 222/189.01 |
| 2,858,943 A * | 11/1958 | Richmond | B21D 51/00 | 210/172.6 |
| 2,883,057 A * | 4/1959 | Richards | B44D 3/10 | 248/94 |
| 3,016,161 A * | 1/1962 | Peplin | B01D 35/023 | 220/86.3 |
| 3,081,912 A * | 3/1963 | Goceliak | B65D 25/48 | 210/474 |
| 3,109,811 A * | 11/1963 | Mcmillen | F16N 39/06 | 210/172.6 |
| 3,263,817 A * | 8/1966 | Buckely | B01D 35/20 | 209/401 |
| 3,322,282 A * | 5/1967 | Lyman | A47L 15/4206 | 210/418 |
| 3,446,624 A * | 5/1969 | Luedtke | B65D 85/808 | 426/77 |
| 3,456,799 A * | 7/1969 | Musial | B01D 35/023 | 210/91 |
| 3,730,120 A * | 5/1973 | Dobell | B63B 35/00 | 114/256 |
| 3,731,815 A * | 5/1973 | Collingwood | B01D 35/023 | 210/497.2 |
| 3,749,248 A * | 7/1973 | Dickinson | F01M 1/10 | 210/436 |
| 3,770,160 A * | 11/1973 | Flider | B65D 45/06 | 217/60 E |
| 3,905,505 A * | 9/1975 | Gallay | B60K 15/077 | 220/563 |
| 3,907,154 A * | 9/1975 | Jesevich | B65D 39/082 | 220/661 |
| 3,912,638 A * | 10/1975 | Beaubien | B01D 29/085 | 210/482 |
| 3,927,797 A * | 12/1975 | Flider | B65D 1/20 | 220/768 |
| 4,025,435 A * | 5/1977 | Shea | B01D 29/27 | 210/469 |
| 4,033,872 A * | 7/1977 | Mori | B01D 35/027 | 210/167.04 |
| 4,065,024 A * | 12/1977 | Atwell | B65D 25/385 | 220/88.2 |
| 4,080,299 A * | 3/1978 | Bartolome | A47J 31/446 | 210/485 |
| D253,082 S * | 10/1979 | Moncrief | D23/209 | |
| 4,259,184 A * | 3/1981 | D'Arnal | A61J 1/05 | 604/407 |
| 4,287,066 A * | 9/1981 | Greutert | B01D 29/085 | 210/500.1 |
| 4,290,888 A * | 9/1981 | Gartmann | B01D 29/085 | 210/474 |
| 4,374,026 A * | 2/1983 | Greutert | B01D 29/085 | 210/493.5 |
| 4,487,114 A * | 12/1984 | Abdenour | A47J 31/02 | 99/308 |
| 4,489,860 A * | 12/1984 | Flider | B65D 45/025 | 222/189.01 |
| 4,520,716 A * | 6/1985 | Hayes | A47J 31/02 | D7/400 |
| 4,650,087 A * | 3/1987 | White | B60K 15/0403 | 220/86.3 |
| 4,731,177 A * | 3/1988 | Hemman | B01D 29/03 | 210/94 |
| 4,740,303 A * | 4/1988 | Greutert | B01D 29/23 | 55/525 |
| 4,804,470 A * | 2/1989 | Calvillo | B01D 29/27 | 210/474 |
| 4,816,148 A * | 3/1989 | Hemman | B01D 29/03 | 210/256 |
| 4,821,630 A * | 4/1989 | Roberts | A47G 19/14 | 426/77 |
| 4,860,805 A * | 8/1989 | Townsend | A47C 27/085 | 210/485 |
| 4,861,478 A * | 8/1989 | Hall | B01D 35/04 | 141/286 |
| 4,867,993 A * | 9/1989 | Nordskog | A47J 31/02 | 426/82 |
| 4,908,130 A * | 3/1990 | Lynne | B01D 29/117 | 210/172.6 |
| 5,025,946 A * | 6/1991 | Butkovich | B67D 7/344 | 220/86.3 |
| 5,036,755 A * | 8/1991 | Abdenour | A47J 31/02 | 99/295 |
| RE33,723 E * | 10/1991 | Hartley | B01D 29/27 | 210/497.3 |
| 5,059,319 A * | 10/1991 | Welsh | B01D 29/01 | 210/232 |
| 5,125,327 A * | 6/1992 | Winnington-Ingram | A47G 19/14 | 99/306 |
| D330,992 S * | 11/1992 | Kleek | D7/400 | |
| 5,168,140 A * | 12/1992 | Welker | B65D 85/8061 | 426/241 |
| 5,186,828 A * | 2/1993 | Mankin | B01D 29/27 | 210/474 |
| 5,221,475 A * | 6/1993 | Mealey | B01D 29/085 | 210/474 |
| 5,252,204 A * | 10/1993 | Chiodo | B23P 17/06 | 210/232 |
| 5,266,194 A * | 11/1993 | Chiodo | B01D 39/12 | 210/232 |
| 5,312,545 A * | 5/1994 | Starin | B01D 35/027 | 210/172.6 |
| 5,318,703 A * | 6/1994 | Heiligman | C02F 1/003 | 210/264 |
| D349,211 S * | 8/1994 | Cerato | D7/400 | |
| 5,407,091 A * | 4/1995 | Wallis | E03B 3/03 | 220/501 |
| 5,411,661 A * | 5/1995 | Heiligman | C02F 9/20 | 210/264 |
| 5,417,860 A * | 5/1995 | Kay | C02F 1/002 | 210/485 |
| 5,505,849 A * | 4/1996 | Rama, Jr. | B01D 35/04 | 210/172.6 |
| 5,520,802 A * | 5/1996 | Brubaker | B01D 35/027 | 210/172.6 |
| 5,532,168 A * | 7/1996 | Marantz | G01N 1/36 | 210/473 |
| 5,652,008 A * | 7/1997 | Heiligman | C02F 1/003 | 248/312.1 |
| 5,678,472 A * | 10/1997 | Millman | A47G 19/14 | 99/321 |
| 5,736,043 A * | 4/1998 | Nichols | A61L 2/06 | 55/504 |

(56) References Cited

U.S. PATENT DOCUMENTS

| | | | | |
|---|---|---|---|---|
| 5,738,786 | A * | 4/1998 | Winnington-Ingram | A47G 19/16 D7/415 |
| D396,603 | S * | 8/1998 | Gasser | D7/400 |
| 5,913,964 | A * | 6/1999 | Melton | B65D 85/816 99/279 |
| 5,914,036 | A * | 6/1999 | Sullivan, Jr. | B01D 29/012 210/474 |
| 5,935,435 | A * | 8/1999 | Hasler | B01D 29/23 210/473 |
| 6,283,013 | B1 * | 9/2001 | Romandy | A47J 31/0636 99/322 |
| 6,357,602 | B2 * | 3/2002 | Rutledge | B01D 17/0208 210/477 |
| D455,054 | S * | 4/2002 | Moench | D7/400 |
| 6,436,283 | B1 * | 8/2002 | Duke | E03B 3/02 210/748.11 |
| 6,439,396 | B2 * | 8/2002 | Rutledge | B01J 20/26 210/DIG. 5 |
| 6,458,303 | B1 * | 10/2002 | Fuehrer | B01D 35/26 264/DIG. 48 |
| 7,025,076 | B2 * | 4/2006 | Zimmerman, Jr. | E03B 1/04 405/36 |
| 7,025,879 | B1 * | 4/2006 | Ticknor | E03B 3/03 210/474 |
| 7,178,675 | B2 * | 2/2007 | Votel | A47L 17/02 210/488 |
| 7,240,809 | B2 * | 7/2007 | Godfrey | B67D 7/04 210/466 |
| D567,020 | S * | 4/2008 | Bodum | D7/400 |
| D575,105 | S * | 8/2008 | Gauss | D7/397 |
| 7,429,322 | B2 * | 9/2008 | Fujita | F02M 37/34 210/172.6 |
| D593,795 | S * | 6/2009 | Tremblay | D7/400 |
| 7,550,077 | B2 * | 6/2009 | Graf | E04D 13/08 52/12 |
| D596,372 | S * | 7/2009 | Lawrence | D34/39 |
| D599,975 | S * | 9/2009 | Magee | D34/39 |
| D605,375 | S * | 12/2009 | Anderson | D34/39 |
| D615,273 | S * | 5/2010 | Magee | D34/39 |
| 7,713,483 | B2 * | 5/2010 | Maiden | B01D 29/96 422/64 |
| D644,072 | S * | 8/2011 | McDonald | D7/667 |
| 8,029,667 | B2 * | 10/2011 | Santinon | B60K 15/04 210/172.6 |
| 8,033,058 | B2 * | 10/2011 | Block | E04D 13/08 52/12 |
| 8,097,151 | B2 * | 1/2012 | Allan | E03F 1/002 52/12 |
| 8,205,492 | B2 * | 6/2012 | Martheenal | E03B 3/03 73/170.17 |
| 8,291,760 | B2 * | 10/2012 | Martheenal | B65D 43/0222 73/170.21 |
| 8,397,746 | B1 * | 3/2013 | Taborek | E04D 13/08 210/170.03 |
| 8,404,110 | B2 * | 3/2013 | Block | E04D 13/08 52/12 |
| 8,438,788 | B2 * | 5/2013 | Bell | E04D 13/08 52/12 |
| 8,517,047 | B2 * | 8/2013 | Teoh | E04D 13/08 210/170.03 |
| 8,517,198 | B2 * | 8/2013 | Muto | B62J 35/00 220/86.3 |
| 8,561,524 | B2 * | 10/2013 | DeMiglio | A47J 31/0689 99/305 |
| 8,578,976 | B1 * | 11/2013 | Davis | E03B 3/03 52/12 |
| D694,579 | S * | 12/2013 | Khubani | D7/400 |
| 8,707,855 | B2 * | 4/2014 | DeMiglio | A47J 31/0689 99/279 |
| 8,808,552 | B2 * | 8/2014 | Lin | B01D 29/085 422/534 |
| 8,881,756 | B1 * | 11/2014 | Taborek | E03B 3/03 210/170.03 |
| D720,960 | S * | 1/2015 | Ko | D7/400 |
| D721,536 | S * | 1/2015 | Advani | D7/400 |
| 9,162,564 | B2 * | 10/2015 | Sakamoto | F02M 37/0076 |
| 9,205,292 | B2 * | 12/2015 | Riordan | A62C 4/00 |
| D752,399 | S * | 3/2016 | Walsh | D7/667 |
| 9,279,237 | B2 * | 3/2016 | Catt Lyon | B01D 29/03 |
| D764,864 | S * | 8/2016 | Hertaus | D7/400 |
| D764,865 | S * | 8/2016 | Hertaus | D7/400 |
| D766,656 | S * | 9/2016 | Mac Innis | D23/209 |
| 9,732,526 | B2 * | 8/2017 | Denk | E04D 13/08 |
| 9,868,627 | B2 * | 1/2018 | Batistakis | B67D 7/005 |
| 9,982,418 | B2 * | 5/2018 | Bennett | E03B 7/095 |
| 9,994,461 | B2 * | 6/2018 | Mitchell | C02F 1/003 |
| 10,005,009 | B2 * | 6/2018 | Qureshi | B01D 35/027 |
| 10,029,132 | B2 * | 7/2018 | Cray | A62C 3/065 |
| 10,154,751 | B2 * | 12/2018 | DeMiglio | A47J 31/0689 |
| 10,208,462 | B2 * | 2/2019 | Carter | E03B 3/02 |
| 10,232,390 | B2 * | 3/2019 | Massold | B05B 15/40 |
| 10,307,625 | B2 * | 6/2019 | Cray | A62C 3/065 |
| 10,328,366 | B2 * | 6/2019 | Hudgens | B01D 35/027 |
| 10,441,902 | B2 * | 10/2019 | Tange | B01D 29/11 |
| 10,463,999 | B2 * | 11/2019 | Washington | B01D 35/005 |
| 10,583,377 | B2 * | 3/2020 | Denk | B01D 29/33 |
| D899,182 | S * | 10/2020 | Brown | D7/400 |
| 10,792,525 | B2 * | 10/2020 | Cray | B67D 7/04 |
| 10,982,425 | B1 * | 4/2021 | Grumbach | E03F 5/041 |
| D927,250 | S * | 8/2021 | Kruger | D23/209 |
| 11,229,864 | B2 * | 1/2022 | Nodomi | B01D 35/0276 |
| 11,412,881 | B2 * | 8/2022 | Giordano | A47J 31/06 |
| 11,534,017 | B2 * | 12/2022 | DeMiglio | A47J 31/0689 |
| 11,618,315 | B2 * | 4/2023 | Waymire | B60K 15/0409 220/86.3 |
| 11,684,198 | B2 * | 6/2023 | DeMiglio | A47J 31/0689 99/279 |
| 11,686,433 | B2 * | 6/2023 | Shimkonis | B01D 35/027 210/767 |
| 11,821,180 | B1 * | 11/2023 | Rahmouni | E03B 3/02 |
| 11,825,974 | B1 * | 11/2023 | Murphy | A47J 19/005 |
| 11,840,684 | B2 * | 12/2023 | Larsen | B01D 29/13 |
| 11,931,611 | B2 * | 3/2024 | Cray | B65D 25/385 |
| 12,060,285 | B2 * | 8/2024 | See | B01D 39/10 |
| 12,096,876 | B2 * | 9/2024 | DeMiglio | A47J 31/0689 |
| 12,121,833 | B2 * | 10/2024 | Yan | B01D 33/15 |
| D1,055,632 | S * | 12/2024 | Lemmer | D7/400 |
| 12,163,326 | B1 * | 12/2024 | Grumbach | C02F 3/342 |
| 12,234,439 | B2 * | 2/2025 | Larsen | C12M 23/26 |
| 12,245,715 | B2 * | 3/2025 | DeMiglio | A47J 31/0689 |
| 12,246,913 | B2 * | 3/2025 | Crossman | B65D 88/54 |
| 12,318,720 | B2 * | 6/2025 | Johnson | B01D 29/58 |
| 12,338,143 | B2 * | 6/2025 | Smith | C02F 1/32 |
| 2001/0004062 | A1 * | 6/2001 | Rutledge | B01D 15/00 210/791 |
| 2001/0004978 | A1 * | 6/2001 | Rutledge | B01D 17/0202 210/799 |
| 2001/0032822 | A1 * | 10/2001 | Koslow | B01D 35/027 210/473 |
| 2003/0146144 | A1 * | 8/2003 | Votel | B01D 29/27 210/348 |
| 2004/0040598 | A1 * | 3/2004 | Zimmerman, Jr. | E03B 1/042 137/357 |
| 2005/0092553 | A1 * | 5/2005 | Yagi | G01F 23/58 184/6.5 |
| 2005/0092667 | A1 * | 5/2005 | Wade | E03B 3/02 210/163 |
| 2005/0109685 | A1 * | 5/2005 | Fujita | F02M 37/34 210/416.4 |
| 2005/0189290 | A1 * | 9/2005 | Maiden | C02F 1/003 210/473 |
| 2005/0217020 | A1 * | 10/2005 | Wade | E03B 3/03 4/665 |
| 2006/0091065 | A1 * | 5/2006 | Godfrey | B67D 7/005 210/466 |
| 2006/0150531 | A1 * | 7/2006 | Cann | E04C 2/36 52/503 |
| 2006/0169320 | A1 * | 8/2006 | Zimmerman, Jr. | E03B 1/04 137/259 |

(56) References Cited

U.S. PATENT DOCUMENTS

| | | | |
|---|---|---|---|
| 2008/0185349 A1 | 8/2008 | Williams | |
| 2008/0272064 A1* | 11/2008 | Leonard | C02F 1/78 210/744 |
| 2009/0065072 A1* | 3/2009 | Adamson | E04D 13/08 137/357 |
| 2009/0065504 A1* | 3/2009 | Vos | A01G 27/06 220/367.1 |
| 2009/0166275 A1* | 7/2009 | Burke | E03B 3/03 210/170.03 |
| 2010/0038300 A1* | 2/2010 | Allan | E03F 1/002 210/248 |
| 2010/0096390 A1* | 4/2010 | Allan | E03B 3/03 220/565 |
| 2010/0147845 A1* | 6/2010 | Wallace | E03B 3/02 220/86.1 |
| 2011/0024341 A1* | 2/2011 | Lyon | E03B 3/03 210/170.03 |
| 2011/0036763 A1* | 2/2011 | Santinon | B01D 35/30 210/232 |
| 2011/0084070 A1* | 4/2011 | Martheenal | E03B 3/03 220/200 |
| 2011/0232766 A1* | 9/2011 | Bell | E04D 13/08 52/16 |
| 2011/0290355 A1* | 12/2011 | Teoh | E03B 3/03 137/561 R |
| 2011/0315610 A1* | 12/2011 | Graf | E03B 3/03 137/561 R |
| 2012/0017996 A1* | 1/2012 | Wenger | E03B 3/03 137/1 |
| 2012/0031782 A1* | 2/2012 | Martheenal | E03B 3/03 206/223 |
| 2012/0222998 A1* | 9/2012 | Pierzchalski | E03B 3/02 210/170.03 |
| 2012/0312759 A1* | 12/2012 | Ries | F02M 37/50 210/172.6 |
| 2013/0092290 A1* | 4/2013 | Waymire | B60K 15/0403 141/286 |
| 2013/0193047 A1* | 8/2013 | Catt Lyon | E03B 3/02 210/170.03 |
| 2014/0129031 A1* | 5/2014 | Carter | E04D 13/00 700/275 |
| 2015/0173556 A1* | 6/2015 | Freeman | A47J 31/06 99/295 |
| 2015/0190741 A1* | 7/2015 | Washington | B01D 35/005 141/11 |
| 2015/0198071 A1* | 7/2015 | Hudgens | F01N 3/2066 210/295 |
| 2016/0017610 A1* | 1/2016 | Denk | E04D 13/08 210/170.03 |
| 2016/0193553 A1* | 7/2016 | Qureshi | B01D 29/27 210/314 |
| 2016/0339370 A1* | 11/2016 | Hudgens | B01D 29/27 |
| 2017/0189837 A1* | 7/2017 | Herold | B01D 29/605 |
| 2017/0274302 A1* | 9/2017 | Denk | B01D 29/336 |
| 2018/0001235 A1* | 1/2018 | Tange | B01D 29/902 |
| 2020/0281393 A1* | 9/2020 | Giordano | B30B 9/26 |
| 2021/0001251 A1* | 1/2021 | Nodomi | B01D 29/23 |
| 2021/0381642 A1* | 12/2021 | Shimkonis | B65D 33/08 |
| 2022/0194691 A1* | 6/2022 | Crossman | B01D 29/071 |
| 2022/0402774 A1* | 12/2022 | See | E04D 13/08 |
| 2023/0249105 A1* | 8/2023 | Yan | B01D 39/10 210/314 |
| 2023/0415077 A1* | 12/2023 | Crossman | B65D 88/54 |
| 2024/0044115 A1* | 2/2024 | Li | B01D 35/02 |
| 2024/0077173 A1* | 3/2024 | Shimkonis | B65D 33/08 |
| 2025/0092647 A1* | 3/2025 | Yang | E03B 3/03 |

FOREIGN PATENT DOCUMENTS

| | | | | |
|---|---|---|---|---|
| AU | 2021393371 A9 * | 7/2024 | | C02F 1/001 |
| JP | 2013-104263 | 5/2013 | | |
| WO | WO-2020227766 A1 * | 11/2020 | | H02G 3/083 |
| WO | WO-2022115918 A1 * | 6/2022 | | B01D 35/0273 |

OTHER PUBLICATIONS

International Search Report and Written Opinion issued Feb. 25, 2022 for corresponding PCT/AU2021/051447.

* cited by examiner

TANK INLET FILTERS

CROSS REFERENCE TO RELATED APPLICATIONS

This application is a National Stage Application, filed under 35 U.S.C. 371, of International Patent Application No. PCT/AU2021/051447, filed on Dec. 3, 2021, which claims priority to Australian Patent Application No. 2020904504 filed on Dec. 4, 2020, contents of both of which are incorporated herein by reference in their entireties.

TECHNICAL FIELD

The present invention relates to a tank screen, such as a tank screen for preventing leaves and other detritus from entering into a water tank.

BACKGROUND ART

A rainwater tank is a container for storing rainwater. Rainwater tanks come in many shapes and sizes and include a water inlet opening for allowing rainwater to enter the tank. Typically, rainwater is directed into the tank using a series of pipes connected to the guttering of a building, with the pipes feeding rainwater towards the tank inlet opening and into the rainwater tank for storage.

One issue faced by almost all rainwater tanks is debris entering the tank through an uncovered, or partially uncovered, inlet opening. A known solution to preventing or minimising debris entering the tank is to install a mesh or screen over the inlet opening. This also assists in preventing mosquitoes from entering the tank. Such meshes or screens typically allow water to flow through and into the tank while preventing debris from entering the tank. Over time, such meshes and screens become clogged with debris and require clearing and/or replacing.

Known tanks or screens typically come in two different styles. One style in the form of a shallow dish having very short, if any, solid sides and a mesh or screen located at the bottom of the shallow dish. The second type comprises a generally frusto-conical or cylindrical mesh having mesh sides and a mesh bottom. Both types of screen are fitted to the tank inlet and extend downwardly into the tank.

The first type of screen is relatively easy to clean and leaf build-up on the mesh can normally be easily seen. However, if leaves fully cover the mesh bottom of the screen, water flow into the tank through the screen could be lowered or even prevented, which represents a waste of rainwater. Indeed, if the screen becomes fully covered by leaves, rainwater would typically splash off the leaves and run away from the tank inlet. The second type of screen is normally deeper than the first type of screen. Therefore, if the mesh bottom of the second type of screen becomes covered with leaves over time, water can still flow into the tank through the mesh sides of the screen. However, due to the increased depth of the sides of the second type of screen, the bottom of that screen typically sits below the height of the overflow of the tank which, of course, is the maximum height that the tank can fill up with rainwater. If there are leaves sitting on the screen, they will rest in the rainwater stored in the tank when the tank is full. As a result, more tannins and other compounds will be extracted from the leaves, leading to discolouration of the rainwater stored in the tank.

It will be clearly understood that, if a prior art publication is referred to herein, this reference does not constitute an admission that the publication forms part of the common general knowledge in the art in Australia or in any other country.

SUMMARY OF INVENTION

The present invention is directed to a tank screen, which may at least partially overcome at least one of the abovementioned disadvantages or provide the consumer with a useful or commercial choice.

With the foregoing in view, the present invention in one form, resides broadly in a tank screen having at least one contact region or contact area for positioning the tank screen relative to a tank inlet, a solid wall having a portion extending above the at least one contact area or contact region, and a mesh screen for filtering leaves from water entering the rainwater tank, the mesh screen comprising a mesh side wall that has an upper region located above the at least one contact area or contact region, at least the upper region of the mesh sidewall being at least partly enclosed by the solid sidewall. In one embodiment, at least the upper region of the mesh sidewall is enclosed by the solid sidewall.

The solid sidewall can direct water passing through the mesh sidewall into the tank and act as a splash shield to minimise loss of water.

In one embodiment, the present invention provides a tank screen having at least one contact region or contact area for positioning the tank screen relative to a tank inlet, a solid wall having a portion extending above the at least one contact area or contact region, and a mesh screen for filtering leaves from water entering the rainwater tank, the mesh screen comprising a mesh side wall that has an upper region located above the at least one contact area or contact region, the solid sidewall forming a splash guard for at least the upper region of the mesh sidewall.

In one embodiment, the mesh screen comprises a mesh base positioned at a lower region of the mesh sidewall. In one embodiment, the mesh base is positioned in use at a level below the at least one contact region or contact area. In this embodiment, the lower region of the mesh sidewall is positioned below a level of the at least one contact region or contact area. In another embodiment, the mesh base is positioned in use at a level at or above the at least one contact region or contact area.

In some embodiments, the at least one contact region or contact area contacts an upper surface of the roof of the tank surrounding the tank inlet when the tank screen is installed. Therefore, the at least one contact region or contact area is at the same level as the upper surface of the roof of the tank in these embodiments.

In preferred embodiments of the present invention, the mesh base is positioned, in use, at a level that is above a maximum water level in a water tank.

In one embodiment, a space is defined between the mesh sidewall and the solid sidewall. This space allows water to flow out sideways through the mesh sidewall and down into the tank.

In one embodiment, the mesh sidewall extends downwardly from or near an upper part of the solid sidewall.

The upwardly extending solid wall provides a splash guard for water entering screen. This minimises loss of rainwater. The upwardly extending solid wall also allows the upper edge of the mesh sidewall to positioned above the level of the tank inlet so that the mesh sidewall can have a significant height/depth whilst also ensuring that the mesh base is located above the maximum water level in the tank. As a result, the benefits of the second type of tank screen discussed in the background section of this specification can be attained whilst avoiding the disadvantage of having leaves sitting on the mesh base soaking in stored rainwater when the tank is full.

In one embodiment, the solid sidewall extends upwardly and inwardly. The solid sidewall may be frusto-conical in shape. The mesh sidewall may extend downwardly from or near an upper edge of the solid sidewall, with the mesh sidewall extending downwardly and inwardly. The mesh sidewall may be of inverted frusto-conical shape.

In one embodiment, the tank screen may have a hood or lid that is fitted to the tank screen. The hood or lid may have one or more openings for receiving a pipe or pipes that deliver(s) rainwater to the tank. In this embodiment, the hood or lid acts as a solar guard to block out sunlight from entering the tank. It also acts as a splash guard to further minimise loss of rainwater. The hood or lid may simply rest on the tank screen or it may be removably connected to the tank screen. The hood or lid maybe snap fitted to the tank screen, or it may click into the tank screen.

In one embodiment, the tank screen is made as an integral unit. In another embodiment, the tank screen comprises an assembly of parts.

In one embodiment, the mesh screen may be reinforced or strengthened by one or more reinforcements, such as reinforcement ribs reinforcement struts.

In one embodiment, the tank screen includes a laterally extending lip or flange and a downwardly extending wall or skirt, or downwardly extending tabs, extend downwardly from the laterally extending lip or flange. The downwardly extending wall or downwardly extending tabs assist in locating the tank screen relative to the water tank inlet.

In another embodiment, the tank screen comprises an outer peripheral wall and the one or more contact regions or contact areas comprises a lower edge of the outer peripheral wall. In another embodiment, the tank screen may comprise an outwardly extending lip or flange that extends partly around the tank screen and a downwardly extending peripheral wall that extends partly around the tank screen.

In one embodiment, the mesh screen may be removable to facilitate cleaning thereof. In one embodiment, the upper, inner region of the solid sidewall may be provided with an inwardly extending lip or flange upon which an outwardly extending flange at or near an upper part of the mesh screen sidewall sits or rests. In another embodiment, the mesh screen may be affixed to connected to the solid sidewall of the tank screen or to a region extending from the solid sidewall of the tank screen.

In one embodiment, the tank screen can be fitted to the water tank using a fitting as described in our international patent application number PCT/AU2020/050466, the entire contents of which are incorporated herein by reference. In summary, our international patent application number PCT/AU2020/050466 describes a fitting for a water tank, the water tank including a wall defining an inlet opening, the fitting comprising a base portion that, in use, is located in an inner volume of the tank, the fitting being mounted in the tank by inserting the base of the fitting into the tank inlet, wherein the fitting is adapted to be mounted into the inlet opening when the fitting is fitted to the tank without the use of additional fasteners, joiners and/or adhesives. The tank screen of the present invention may interconnect with, clip into or snap fit into the fitting as described in our international patent application number PCT/AU2020/050466.

In one embodiment, the fitting of international patent application number PCT/AU2020/050466 comprises a solar shield.

The fitting may be adapted to be mounted into the inlet opening by snap fitting, by virtue of a friction fit, by provision of gripping teeth on the side wall of the inlet, by a combination of a screw and complementary thread on one of the inlet of the tank and the complementary part on the fitting. In some embodiments, the fitting is provided with a snap-fit mechanism that engages with the tank when the fitting is inserted into the inlet of the tank.

In a second aspect described in our international patent application number PCT/AU2020/050466, a fitting for a water tank is provided, the water tank including a wall defining an inlet opening, the fitting comprising:

a. a solar shield for mounting to an edge of the wall or to a mounting member mounted to the inlet, the edge defining the inlet opening, the solar shield including:
  i. a base defining a lower region,
  ii. at least a first arm extending upwardly from the base, the first arm having a portion that overlies an external surface of the tank when the fitting is fitted to the tank;
  iii. at least a second arm extending upwardly from the base; and
  iv. a solar shield adapted to allow fluid to pass through, wherein the solar shield is adapted to snap fit into the inlet opening or to the mounting member when the fitting is fitted to the tank without the use of additional fasteners, joiners and/or adhesives.

In one embodiment, the fitting comprises:
a. a solar shield for mounting to an edge of the wall, the edge defining the inlet opening, the solar shield including:
  v. a base defining a lower region,
  vi. at least a first arm extending upwardly from the base, the first arm having a portion that overlies an external surface of the tank when the fitting is fitted to the tank;
  vii. at least a second arm extending upwardly from the base;
  viii. a solar shield portion adapted to allow fluid to pass through;
  wherein the at least one first arm and the at least one second arm sandwiches at least a portion of the wall of the water tank when the fitting is fitted to the tank.

Advantageously, in preferred embodiments, the solar shield is able to be snap fitted into the inlet opening when the fitting is fitted to the tank without the use of additional fasteners, joiners and/or adhesives.

As mentioned above, the solar shield includes a base. A skilled person would understand that the base may be any particular size or shape. Typically, the size and shape of the base substantially corresponds to the size and shape of the cross-sectional area of the water tank inlet opening. Usually, the shape of the base is circular or substantially circular.

As mentioned above, the solar shield further includes at least one first arm extending upwardly from the base. In some embodiments, the solar shield includes at least two or more first arms. In some embodiments, the solar shield includes at least three or more first arms. A skilled person, however, would understand that the solar shield may include any number of first arms. Generally, the larger the base the more first arms the solar shield will have. Typically, the first arms are evenly spaced round the base.

In some embodiments, each first arm may extend upwardly and outwardly or include an arm portion that extends upwardly and outwardly.

Each first arm may include at least a lower portion. Typically, the lower portion of each first arm extends vertically, or substantially vertically, from, or relative to, the base.

Each first arm may further include an upper portion. The upper portion of each first arm may extend horizontally, or substantially horizontally, from, or relative to, the corresponding lower portion. Each upper portion may also extend perpendicular, or substantially perpendicular, relative to the corresponding lower portion. In most embodiments, the portion that overlies the external surface of the tank when the fitting is fitted to the tank forms part of the upper portion of each first arm.

Each first arm may further include an intermediate portion. Usually, the intermediate portion bridges the upper portion and the lower portion. In some embodiments, the intermediate portion tapers inwardly from the upper portion towards the lower portion. Advantageously, the intermediate portion is adapted to guide the tank screen into a central position during mounting a tank screen to the solar shield.

In some embodiments, the fitting may comprise a tank screen in accordance with the present invention. The tank screen may be positioned so that it is fitted at least partially into the solar shield. The solar shield may include one or more tank screen abutment surfaces for abutting one or more surfaces of the tank screen when the tank screen is mounted to the solar shield. In most embodiments, each first arm includes a tank screen abutment surface. In some embodiments, each tank screen abutment surface may form, or at least partially form, an inner surface of the upper portion of at least one of the at least one first arm. In some embodiments, each tank screen abutment surface may form, or at least partially form, an inner surface of the lower portion of at least one of the at least one first arm. In some embodiments, each tank screen abutment surface may form an inner surface of the intermediate portion of at least one of the at least one first arm. Advantageously, in preferred embodiments, the one or more tank screen abutment surfaces centrally locates the tank screen relative to the solar shield after mounting.

As mentioned above, in some embodiments the solar shield includes at least one second arm. In some embodiments, the solar shield includes at least one second arm corresponding to each first arm. Typically, each second arm is located adjacent the corresponding first arm. In alternative embodiments, the solar shield includes at least one pair of second arms corresponding to each first arm. In these embodiments, each arm of each pair of second arms is located either side of the corresponding first arm. Typically, each second arm extends upwardly and outwardly from the base.

Typically, each second arm will be shorter in length than each first arm. Typically, each second arm will not extend beyond the surface of the at least one first arm which abuts the outer surface of the water tank.

Each second arm may include a body. The body may be a resilient body. The body, or at least a portion of the body, may be adapted to deflect inwardly when the solar shield is being fitted to the water tank. Further, the body, or at least a portion of the body, may be adapted to deflect outwardly once the solar shield has been fitted to the water tank. Where the second arm is a resilient arm, the resiliency of the arm enables it to deflect outwardly once the fitting has been inserted deeply enough into the tank inlet such that the top of the second arm is below the wall of the tank that defines the tank inlet.

Each second arm may include a lower portion and an upper portion. The upper portion may be an end portion. The lower portion may be substantially elongate. In some embodiments, the lower portion may be comparatively longer than the end portion. Advantageously, in preferred embodiments, the longer the length of the lower portion the larger the potential deflection of the second arm.

The solar shield may include one or more solar shield guide surfaces for guiding the solar shield during fitting the solar shield into the water tank inlet. The one or more solar shield guide surfaces may form, or at least partially form, one or more outer surfaces of the solar shield. In some embodiments, each solar shield guide surface may form, or at least partially form, an outer surface of at least one or more of the one or more second arms. In some embodiments, each solar shield guide surface may form, or at least partially form, an outer surface of one or more end portions. Advantageously, in preferred embodiments, the one or more solar shield guide surfaces help guide the solar shield during fitting the solar shield to the water tank inlet.

The solar shield may include one or more inner tank abutment portions for abutting an inside surface of the water tank once the solar shield has been fitted to the water tank. Typically, each inner tank abutment portion may form part of each at least one second arm. In some embodiments, each second arm may include a pair of inner tank abutment portions. Typically, the two or more inner tank abutment portions are evenly spaced apart.

Each inner tank abutment portion may extend upwardly from one or more of the at least one or more second arm. Each inner tank abutment portion may extend from an end of one or more of the at least one or more second arm. Each inner tank abutment portion may extend from an upper edge of the end portion of one or more of the at least one or more second arm. Each inner tank abutment portion may be in the form of a protrusion. A skilled person would understand that each inner tank abutment portion may be any particular size or shape. In some embodiments, each inner tank abutment portion may be substantially dome shaped.

The solar shield may further include at least one third arm. The solar shield may include at least two or more third arms. Typically, the solar shield includes at least three or more third arms. Each third arm may extend upwardly and away from the base. Typically, the third arms are evenly spaced round the base.

Each third arm may include a resilient body adapted to deflect inwardly when fitting the solar shield to the water tank. The body may include at least an upper portion, that overlies an outer surface of the water tank when the fitting is fitted to the water tank, and a lower portion. The upper portion may include an abutment surface for abutting an outer surface of the water tank when the solar shield is fitted to the water tank. The third arms assist in properly locating the fitting in a centralised location relative to the inlet of the tank. The third arms may be located anywhere on the fitting and the number of third arms may vary. It is preferable that the third arms are relatively equally spaced to provide even centralizing force about the fitting.

The solar shield may further include one or more apertures, each aperture adapted to receive a fastener. Each aperture may be defined by the upper portion of each first arm. Typically, the location of each aperture corresponds to a corresponding aperture defined by the tank screen.

The solar shield may further include at least one engagement portion for engaging a corresponding engagement portion on the tank screen. In some embodiments, the solar shield will include two or more engagement portions, each engagement portion corresponding to an engagement portion located on the tank screen. In some embodiments, the solar shield will include three or more engagement portions, each engagement portion corresponding to an engagement portion located on the tank screen. Each engagement portion located on the solar shield may be a tank screen engagement portion. Typically, each of the at least one first arms will define an engagement portion.

Each engagement portion located on the tank screen may include a boss. Each boss may be substantially elongate. Each boss may include a ridge. Each ridge may include a substantially horizontal lower surface. Each ridge may include a substantially angled upper surface. Each boss may extend outwardly from an outer side of each upper portion of each first arm.

As mentioned above, the solar shield includes a solar shield portion. The solar shield portion may form, or at least partially form part of the base. A skilled person would understand that the solar shield portion may be any particular size or shape already known in the art. Typically, however, the shape and the size substantially corresponds to the cross-sectional area of the water tank inlet. In some embodiments, the solar shield is circular, or substantially circular. Typically, the solar shield portion is substantially convex-shaped.

Typically, the solar shield portion includes one or more apertures for allowing the fluid to pass through. Typically, the solar shield portion includes multiple apertures. Usually, the multiple apertures are evenly spaced around the solar shield portion. Advantageously, fluid is evenly distributed around the solar shield portion so that when the fluid enters the water tank, the fluid is distributed about an area in order to minimise aggregation of sediment that may be present in the water tank.

In one embodiment, the tank screen of the present invention is adapted to be mounted to the water tank using the tank fitting as described in our international patent application number PCT/AU2020/050466. In this embodiment, the outward extending lip or flange of the tank screen rests on or is positioned above the tank fitting. The outwardly extending lip or flanged may have a downwardly extending skirt. The downwardly extending skirt may have an inwardly extending projection or shoulder that engages with an outwardly extending projection or shoulder on the tank fitting. This allows the tank screen to be click fitted onto the tank fitting. The tank screen may further include a downward extending wall extending downwardly from the outwardly extending lip or flange, the downwardly extending wall being positioned inside an inner periphery of the tank screen in use, the downwardly extending wall including one or more outwardly extending projections to assist in fitting the tank screen to the tank fitting.

In another embodiment, the tank screen may be screwed into the tank inlet. In this embodiment, the downwardly extending wall extending downwardly from the outwardly extending lip or flange may be provided with a screw thread.

In one embodiment, the laterally extending lip or flange of the tank screen rests on an upper surface of the water tank surrounding the tank inlet. In another embodiment, a downwardly extending skirt of the laterally extending lip or flange rests on an upper surface of the water tank at or near the tank inlet. In another embodiment, the laterally extending lip or flange of the tank screen rests on a tank fitting as described in our international patent application number PCT/AU2020/050466. In another embodiment, a lower edge of a peripheral wall or peripheral skirt rests on an upper surface of the tank or rests on an upper surface of a tank fitting fitted to the tank inlet.

In one embodiment, the tank screen has a lower solid wall that, in use, is positioned within the tank inlet, with a lower edge of the lower solid wall being located below the one or more contact regions or contact areas. The lower solid wall may comprise part of the solid wall of the tank screen, such as a lower extension of the solid wall of the tank screen, or it may be offset from the solid wall of the tank screen. The lower solid wall assists in placing the tank screen within the tank inlet and also assists in directing rainwater from the pipes into the mesh screen.

In one embodiment, from 20 to 80%, or from 30% to 70%, or from 40 to 60%, of the height of the mesh sidewall of the mesh screen is located above the one or more contact regions or contact areas. In one embodiment, when fitted, the mesh base of the tank screen is positioned above a maximum water level inside the water tank.

The water tank of embodiments of the present invention provides a deep mesh screen that allows for high water flow into the tank, even if the mesh base of the mesh screen is covered with leaves. The mesh base is positioned above the maximum water level in the tank so that leaves can that are collected on the mesh base do not sit in the rainwater collected in the tank. This assist in improving water quality within the tank. The solid sidewalls of the tank guard act as a splash guard which minimises loss of rainwater.

Any of the features described herein can be combined in any combination with any one or more of the other features described herein within the scope of the invention.

The reference to any prior art in this specification is not, and should not be taken as is a cross-sectional view of the tank fitting, an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

It will be appreciated that the drawings have been provided for the purpose of illustrating preferred embodiments of the present invention. Therefore, the skilled person will understand that the present invention should not be considered to be limited solely to the features as shown in the attached drawings.

Figure 1:
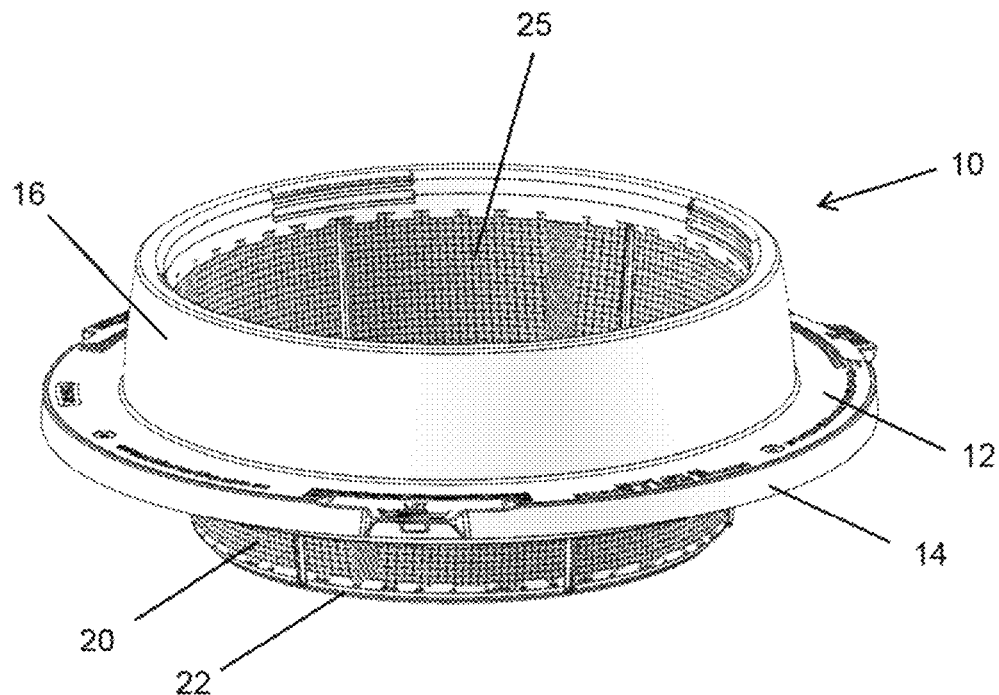
FIG. 1 is a perspective view of a tank screen in accordance with an embodiment of the present invention.
Figure 2:
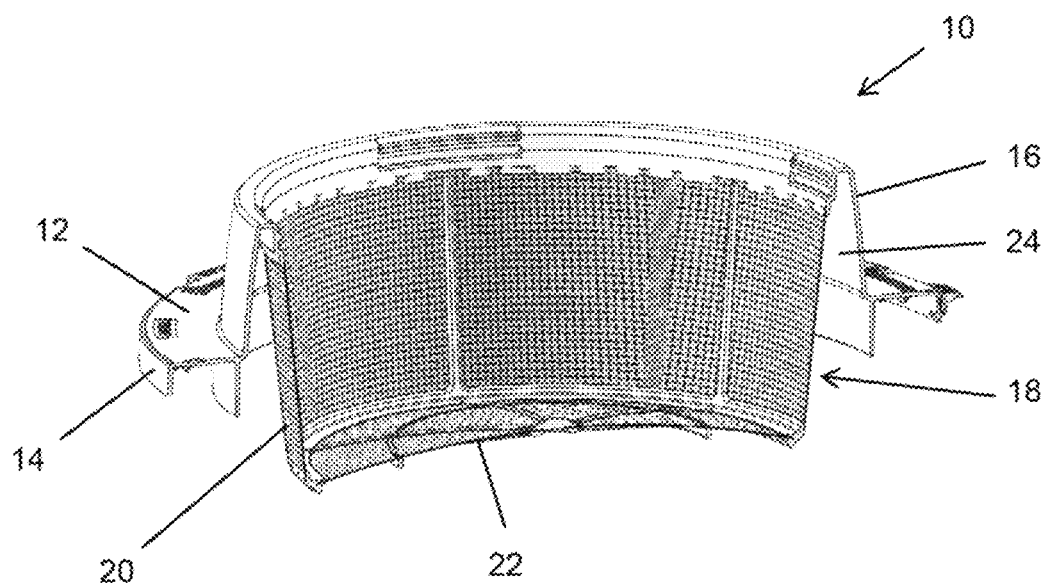
FIG. 2 is a cross-sectional perspective view of the tank screen shown in FIG. 1.

FIGS. 1 and 2 show various views of a tank screen 10 in accordance with one embodiment of the present invention. Tank screen 10 includes a laterally extending flange 12 that, in the embodiment shown in FIG. 1, extends around the periphery of the tank screen 10. The laterally extending flange 12 has a peripheral skirt 14. In use, the lower edge of the peripheral skirt 14 comes into contact with the upper surface or roof of a water tank. In this manner, the upper surface or roof of the water tank supports the tank screen 10 in position. It will be appreciated that the skirt 14 and flange 12 are positioned above the upper surface of the roof of the water tank.

The tank screen 10 also includes an upwardly extending solid wall 16. As can best be seen in FIG. 2, the solid wall 16 extends upwardly and inwardly so that it defines a generally open frusto-conical shape. A screen mesh 18, which comprises a mesh sidewall 20 and a mesh base 22, is connected to an inner extension of solid sidewall 16 and extends downwardly and inwardly therefrom. As can be seen from FIG. 1, the mesh base 22 is positioned lower than the lower edge of the skirt 14. Further, a space or gap 24 exists between the mesh sidewall 20 and the solid sidewall 16. In use, water entering into the open top 25 defined by the upper edge of the solid sidewall 16 can pass through the mesh screen 18 and into the tank. If the mesh base 22 becomes blocked by leaves, water can still pass through the mesh sidewall 20 and into the water tank. The solid sidewall 16 acts as a splash guard so that any water splashing sideways through the mesh sidewall 20 contacts the solid sidewall 16 and falls into the water tank. This minimises loss of water.

In the embodiment shown in FIGS. 1 and 2, the lower edge of the peripheral skirt 14 of the laterally extending flange 12 forms the contact region that positions the tank screen relative to the roof of the water tank. In some embodiments, the peripheral skirt 14 may be omitted such that the flange 12 forms the contact region that contacts the top of the roof of the tank. In other embodiments, the flanged 12 and skirt 14 may be replaced by one or more feet or one or more tabs extending from the solid sidewall 16, with the one or more feet or one or more tabs contacting the upper surface of the roof of the water tank to thereby position the tank screen relative to the water tank. Alternatively, a further skirt or a plurality of skirts may extend directly from the solid sidewall 16.

Figure 3:
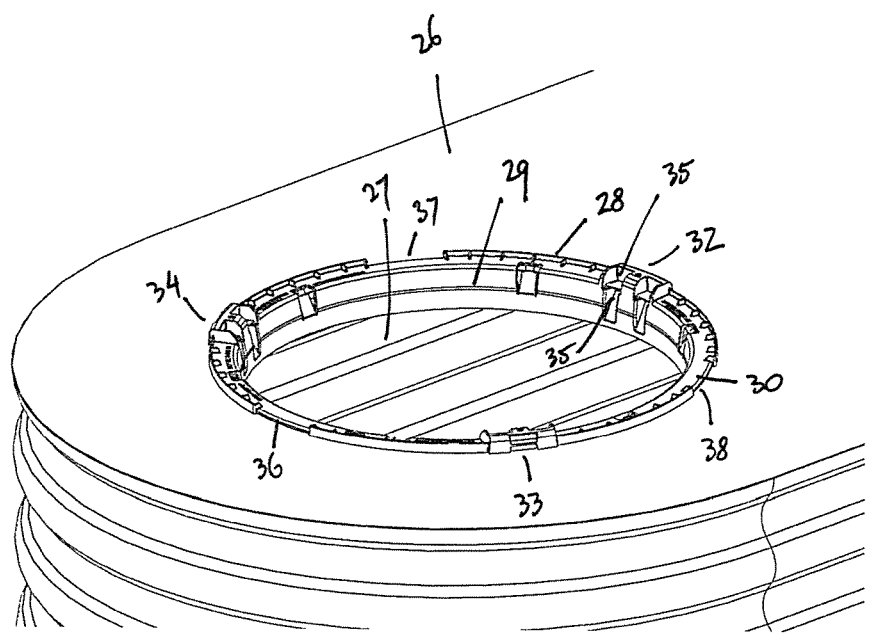
FIG. 3 is a perspective view of a tank inlet having a tank fitting attached thereto, the tank fitting being as described in our international patent application number PCT/AU2020/050466.

FIG. 3 shows a water tank 26 having a tank inlet 27 formed in the roof of the tank. As is typical in almost all commercially available water tanks, the tank inlet 27 is formed by a circular opening in the roof of the water tank 26. The tank inlet 27 is fitted with a tank fitting 28 that is as described in our international patent application number PCT/AU2020/050466. In brief terms, the tank fitting 28 comprises a ring 29 that fits into the tank inlet 27. An upper flange 30 extends from the ring 29. The upper flange 30 overlies part of the roof of the tank that defines the tank inlet 27.

Figure 8:
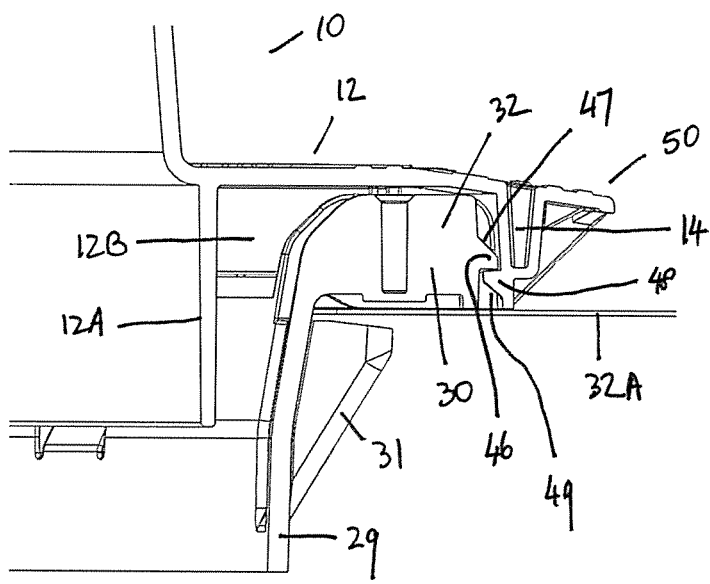
FIG. 8 is an enlarged view of the outer periphery of the tank screen and tank fitting shown in FIG. 7.

Turning now to FIG. 8, which shows an enlarged cross-sectional view that shows further details of the tank fitting 28, the ring 29 and the upper flange 30 can be seen. The tank fitting 28 has a plurality of upwardly and outwardly extending legs 31 extending outwardly from the ring 29. The legs 31 have an upper edge that, when fitted, is located just below or in contact with the underside of the roof 32A of the water tank 26. In order to fit tank fitting 28 to the inlet 27 of the water tank 26, the ring 29 of the tank fitting 28 is inserted through the tank inlet 27. The legs 31 contact the edges of the roof that define the tank inlet 27 and cause the legs 31 to deflect inwardly as the tank fitting 28 is pushed downwardly. Once the upper edges of the legs 31 pass below the roof 32A of the tank, they snap back outwardly to thereby hold the tank fitting in the tank. Returning now to FIG. 3, the legs 31 are generally provided in the regions 32, 33 and 34 of the tank fitting 28. The regions 30 to 33, 34 are in the form of enlarged bosses that have a plurality of recesses 35 formed therein. The tank fitting 28 also has spaced recessed regions 36, 37 and 38 which can receive the connecting portion of an arm of a solar shield, as will be described in more with reference to FIG. 4.

Figure 4:
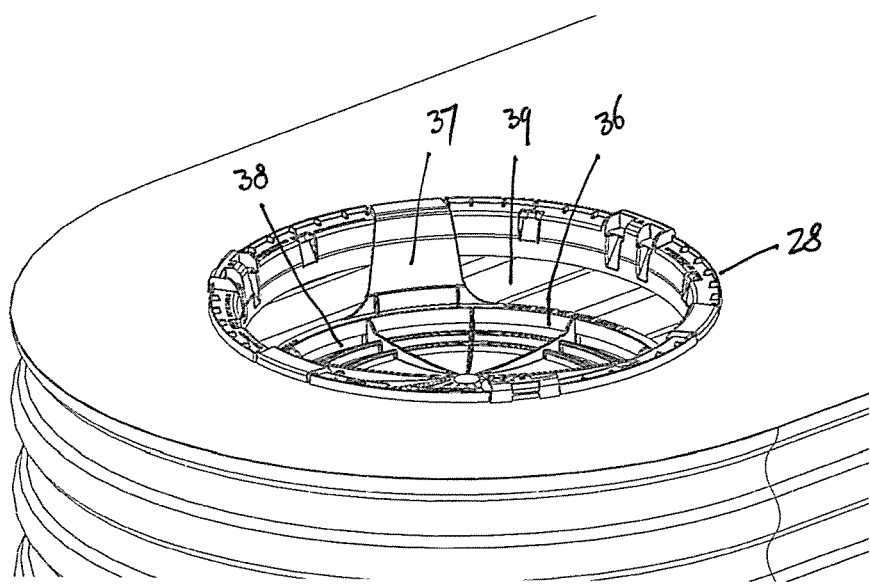
FIG. 4 is a perspective view of the tank inlet with tank fitting shown in FIG. 3 with a solar shield also fitted thereto.

FIG. 4 shows a solar shield 36 affixed to the tank fitting 28. The solar shield 36 includes three equally spaced upstanding arms, one of which is shown at 37. The solar shield has a base 38 which has openings formed by angled slats. The openings formed by the angled slats allow water to flow therethrough but effectively prevent sunlight incident on the solar shield from passing therethrough due to the angled nature of the slats. Further, spaces, one of which is shown at 39, are defined by the base of the solar shield, adjacent arms of the solar shield and the tank inlet. Water can also flow through those spaces 39 but due to the geometry of the tank opening and the solar shield, sunlight is effectively prevented from passing therethrough, or at least only a minimal amount of sunlight can pass therethrough.

Figure 5:
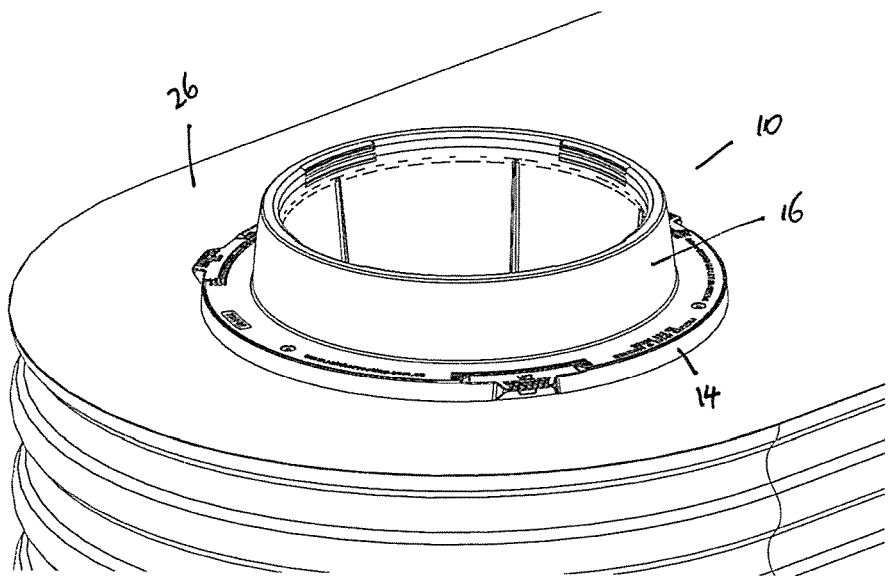
FIG. 5 is a perspective view of a water tank having a tank screen as shown in FIG. 1 fitted to the tank inlet.

Once the solar shield 36 has been fitted to the tank fitting 28 (and appreciating that the solar shield 36 is an optional element that may be omitted), the tank screen 10 shown in FIG. 1 can be fitted to the tank fitting 28. This is shown in FIG. 5. As can be seen from FIG. 5, the lower edge of skirt 14 rests on the top of the roof 32A of the tank 26. As a result, the solid wall 16 is supported above the roof of the tank 26.

Figure 6:
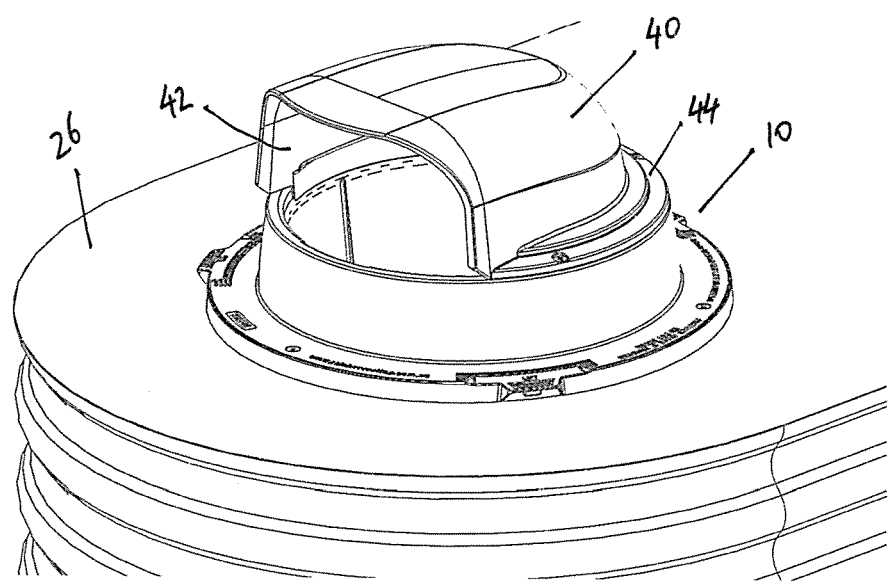
FIG. 6 is a perspective view of the tank screen shown in FIG. 5 having a hood or lid fitted thereto.
Figure 7:
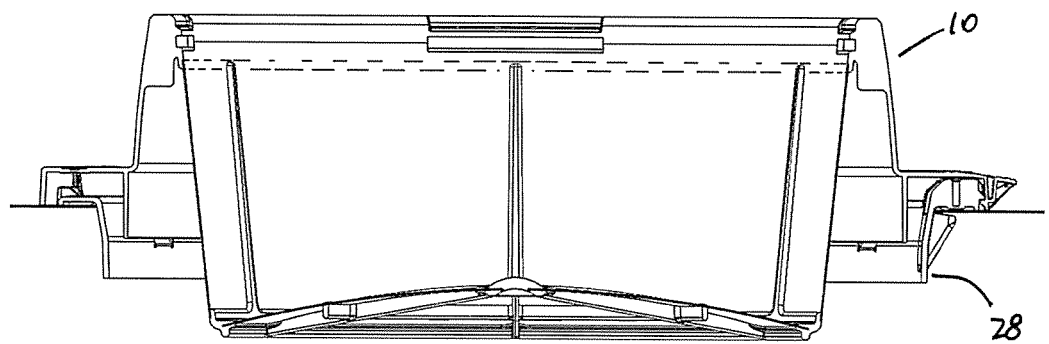
FIG. 7 is a cross sectional view of a tank screen as shown in FIG. 1 being fitted to a tank fitting that, is itself fitted to the inlet of water tank.
Figure 11:
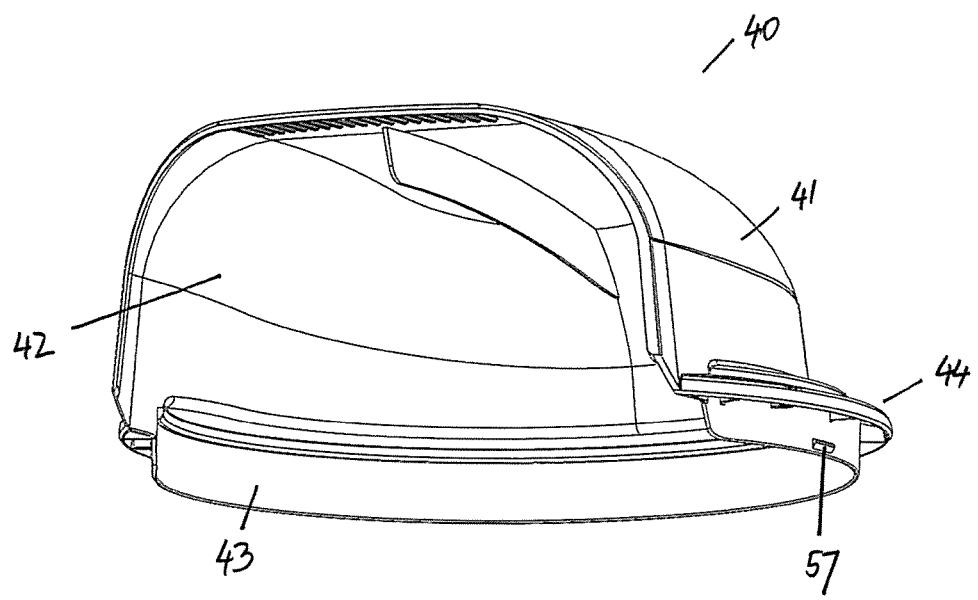
FIG. 11 is a perspective view of the hood shown attached to the tank screen in FIG. 9.
Figure 12:
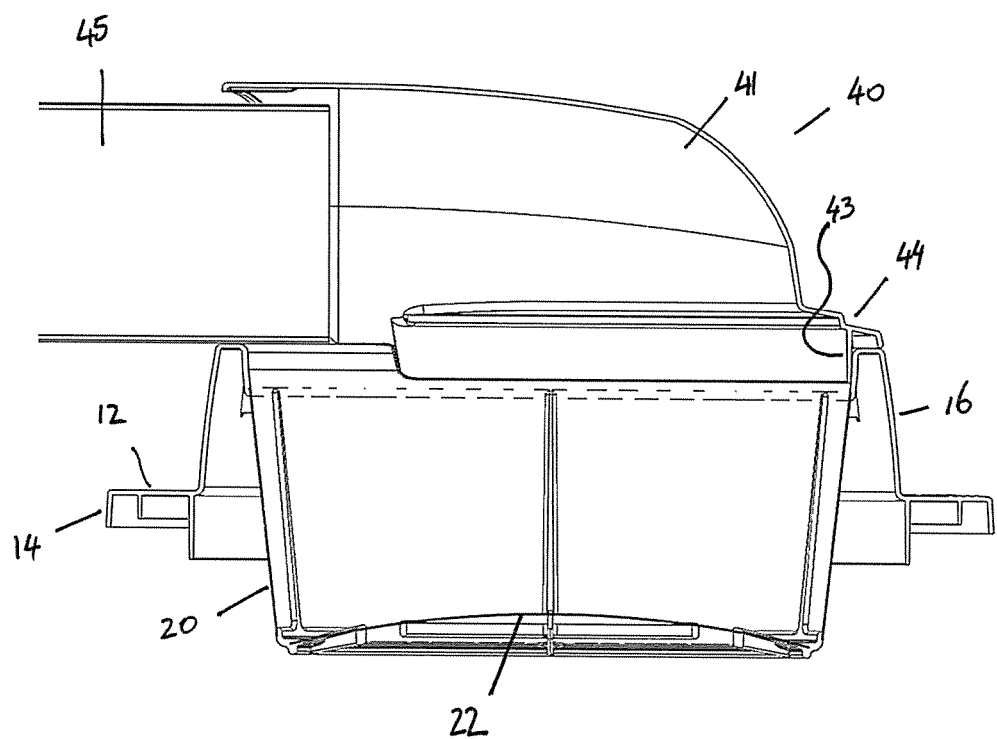
FIG. 12 is a cross sectional view of the tank screen with a hood fitted and water pipe installed.

In FIG. 6, a hood 40 has been fitted to the tank screen 10. The hood 40 is shown in more detail in FIG. 11. The hood 40 has a solid wall/roof 41. An opening or gap 42 in the hood 40 can receive one or more pipes that supply water to the tank 26. Downwardly extending skirt 43, which is shaped to fit snugly inside the open top 25 of the tank screen 10 is located beneath an outwardly extending flange 44. When the hood 40 is positioned on the tank screen 10, the skirt 43 and flange 44 assist in correct positioning of the hood 40 on the tank screen 10. In other embodiments, not shown, the hood 40 may fit into the open top 25 of the tank screen using a friction fit or using one or more clips, one or more removable fasteners, or one or more clasps, or similar. FIG. 12 shows a water pipe 45 being positioned so that it extends into the hood 40.

Returning again to FIG. 8, fitment of the tank screen 10 to the tank fitting 28 is shown in more detail. As can be seen from FIG. 8, boss 32 of tank fitting 28 has an outwardly extending shoulder 46. Shoulder 46 has a ramped upper surface 47. The skirt 14 of the tank screen 10 has a shoulder 48 that has a ramped lower surface 49. As the tank screen is lowered onto the tank fitting, the ramped surfaces 46, 49 come into contact with each other and this forces the skirt 14 to flex outwardly. Once the upper surface of shoulder 49 has passed the lower surface of shoulder 46, the skirt 14 of the tank screen 10 snaps back and the shoulders 46, 49 assume the position shown in FIG. 8. In this position, the tank screen 10 is retained on the tank fitting 28. Also shown in FIG. 8 is an outer lip 50 which provides a finger space for a user to be able to flex the skirt 14 outwardly when it is desired to remove the tank screen 10 from the tank fitting 28.

As is also shown in FIG. 8, the tank screen 10 includes downwardly extending inner wall 12A having a plurality of outwardly extending projections 12B. In the embodiment shown in FIG. 8, the outwardly extending projections 12B assist in locating the inner wall 12A and hence the tank screen 10 relative to the tank fitting 28. In embodiments where the tank screen 10 is fitted directly to the tank inlet, the projections 12B and inner wall 12A assist in locating the tank screen 10 relative to the tank inlet. The inner wall 12A and the projections 12B effectively act as a guide when inserting the tank screen into the tank fitting or into the tank inlet.

Figure 9:
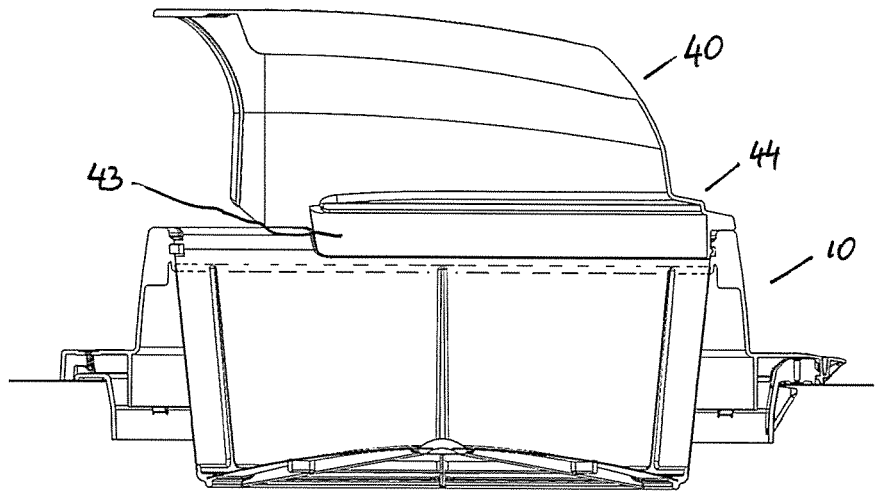
FIG. 9 is a cross-sectional view of the tank screen shown in FIG. 7 having a hood fitted thereto.
Figure 10:
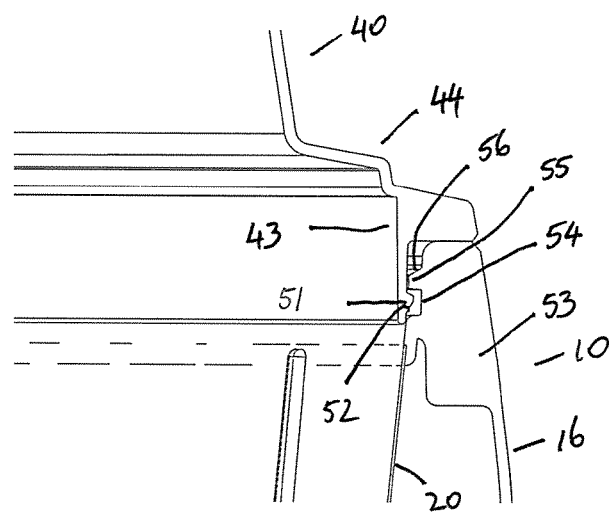
FIG. 10 is an enlarged view that more clearly shows how the hood is fastened to the tank screen.

FIGS. 9 and 10 show further detail of how the hood 40 is affixed to the tank screen 10. In particular, the skirt 43 of the hood 40 has a shoulder 51 having a ramped surface 52. The upper end of solid side wall 16 of tank screen 10 has an enlarged region 53 that has a recess 54 formed on an inner part thereof. Recess 54 is partly defined by a shoulder 55 that has a ramped upper surface 56. When the hood is lowered onto the tank screen, the ramped surface 52 contacts ramped surface 56 to force the skirt 43 of hood 40 inwardly. Once the upper surface of shoulder 51 has passed the lower surface of shoulder 55, the skirt 43 snaps outwardly so that the shoulder 51 is retained in recess 54. As can be seen from FIG. 11, shoulder 51 can be formed by a tab 57. A plurality of tabs may be formed on the skirt 43 of hood 40.

Figure 13:
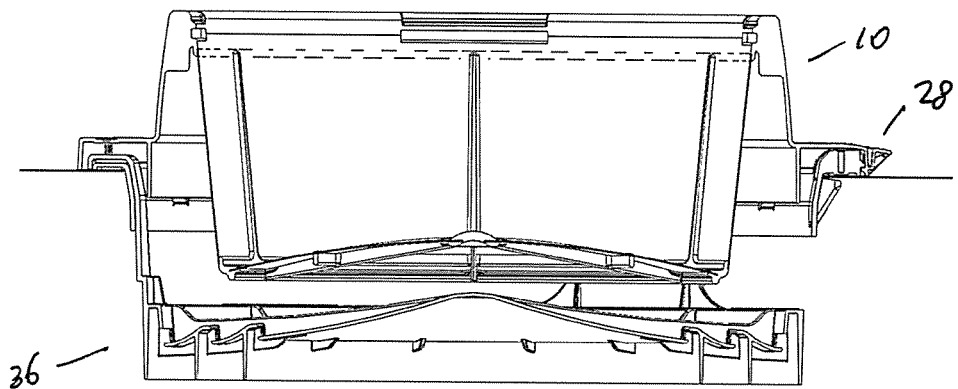
FIG. 13 is a cross sectional view showing a tank fitting, solar screen and tank screen fitted to the inlet of a water tank.
Figure 14:
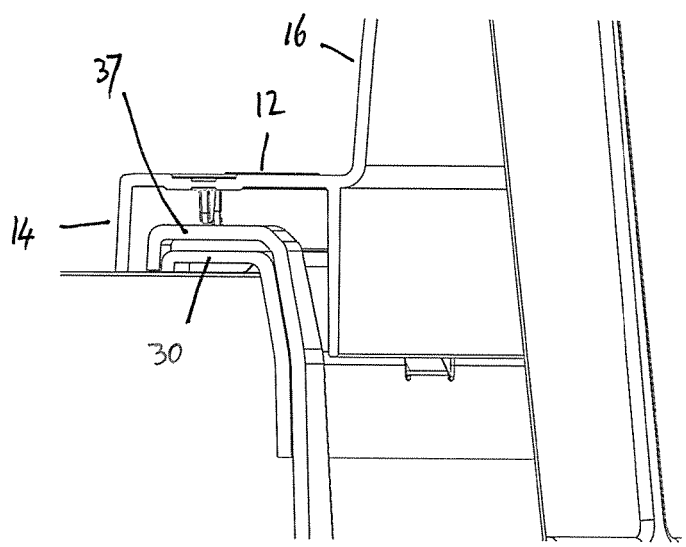
FIG. 14 is an enlarged view showing the relative positioning of parts of the outer periphery of the tank fitting, solar screen and tank screen.

FIG. 13 shows a cross-sectional side view of the tank screen 10, the tank fitting 28 and in the solar shield 36. FIG. 14 shows the arm 37 of the solar shield 36 overlying the flanged 30 of the tank fitting 28. The skirt 14 and flange 12 of the tank screen 10 overlie the arm 37 of the solar shield 36.

Figure 15:
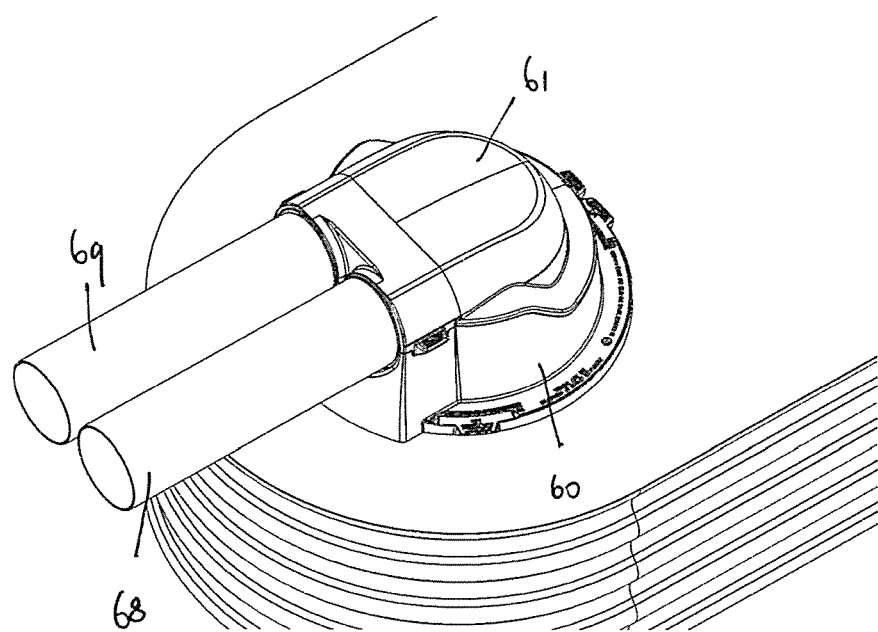
FIG. 15 is a perspective view of the tank screen being fitted to the water tank, in accordance with another embodiment of the present invention.
Figure 16:
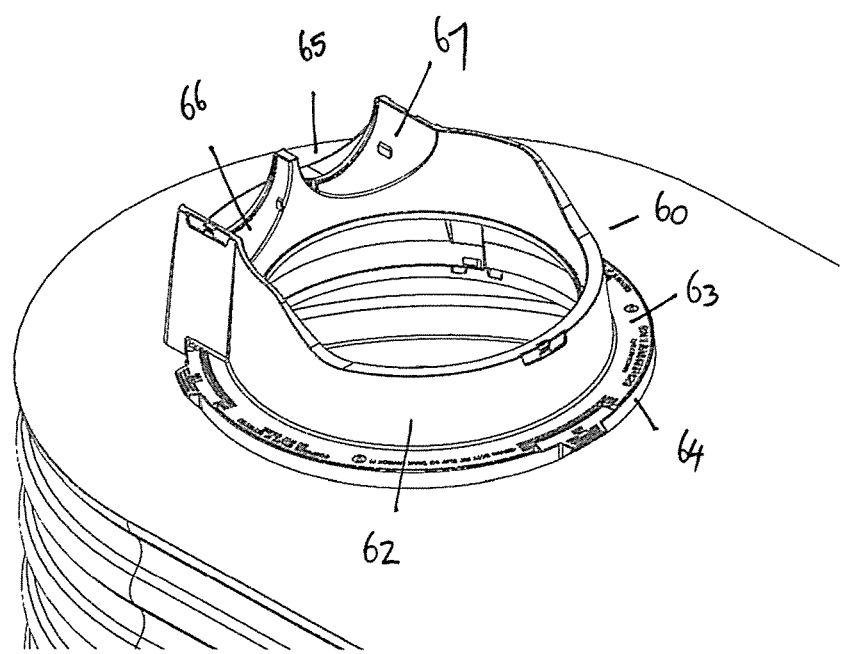
FIG. 16 is a perspective view showing a mounting base of the tank screen being fitted to the inlet of the water tank.

FIGS. 15 to 25 show various views of another embodiment of the present invention. In the embodiment shown in FIGS. 15 to 25, the tank screen comprises an assembly that has a mounting base, a removable mesh screen, and a hood. FIG. 15 shows the mounting base 60 and the hood 61 and FIG. 16 shows the mounting base 60. Mounting base 60 had solid side wall 62. As can be seen from FIG. 16, the upper edge of solid side wall 62 is of a contoured shape. The lower edge of the hood 61 is of complimentary contour so that they fit closely together. The mounting base 60 also has an outwardly extending flange 63 and a downwardly extending skirt 64. Flange 63 and skirt 64 are similar to flange 12 and skirt 14 of tank screen 10 of the first embodiment shown in the drawings.

The mounting base 60 also includes a rear section 65 (it being appreciated that the terms "front" and "rear" have been arbitrarily assigned to describe the mounting base 60). The rear section 65 includes two circular recesses 66 and 67 that can receive water pipes 68 and 69. Similarly, the rear part of the hood 61 has recesses 70, 71 (best seen in FIG. 24) that can fit around the upper parts of pipe 68, 69.

The mounting base 60 fits onto a tank fitting 28 in essentially the same manner as the tank screen 10 fits into the tank fitting 28 of the embodiment shown in FIGS. 1 to 14. For brevity of description, this will not be described further with reference to the embodiment of FIGS. 15 to 25. However, FIG. 23 does show positioning of the mounting base 60 relative to a tank fitting 28.

Figure 23:
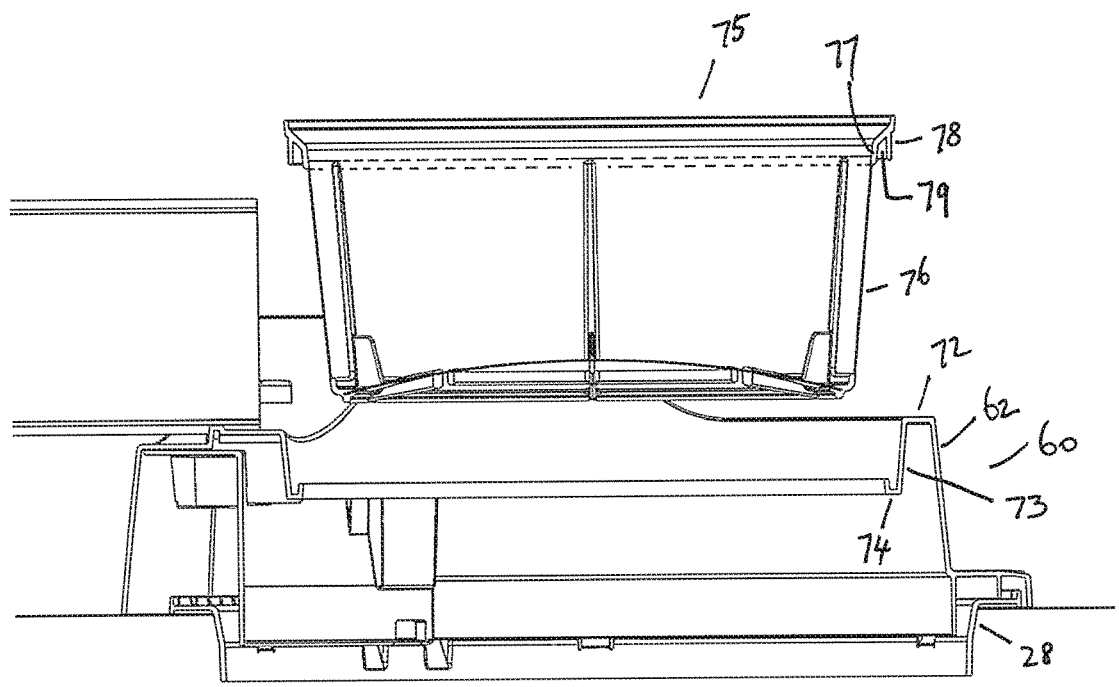
FIG. 23 is a cross-sectional view of the assembly shown in FIG. 22 but with the hood removed to demonstrate simple removal of the mesh screen.
Figure 24:
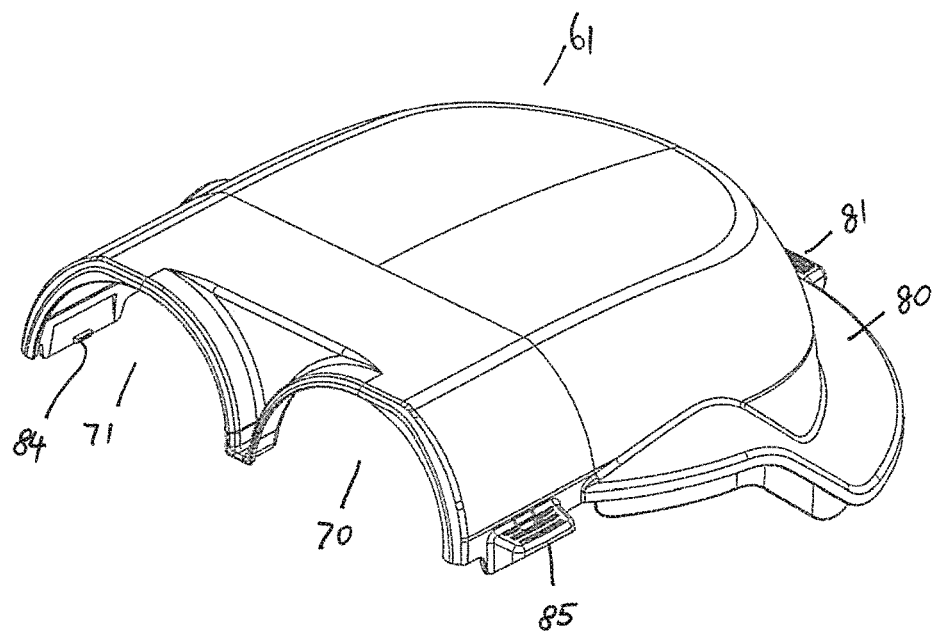
FIG. 24 is a perspective view of the hood used in the embodiment shown in FIG. 15.

FIG. 23 also shows that the mounting base 60 includes a flange 72 that extends inwardly from the upper part of solid side wall 62. A downwardly extending inner wall 73 extends downwardly from the inner part of flange 72. Inner wall 73 finishes in a hanging lip 74. The mesh screen 75 has a mesh sidewall 76 that extends from a solid plastic ring 77. The solid plastic ring 77 has a further downwardly extending skirt 78 that together with ring 77 defines a space 79. When the mesh screen 75 is inserted into the mounting base 60, the skirt 78 and space 79 become supported by the hanging lip 74 of the mounting base to thereby hang or suspend the mesh screen 75 in the mounting base 60. In this manner, the mesh screen 75 can be removably inserted into the mounting base 60. This is shown in greater detail in the enlarged view that is FIG. 21.

Figure 17:
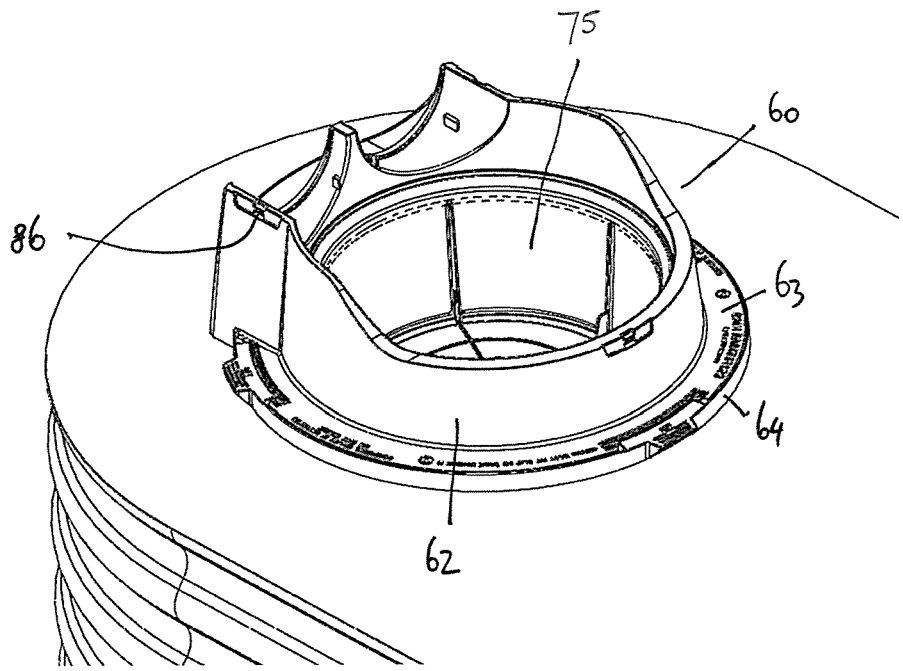
FIG. 17 is a perspective view showing the mounting base of FIG. 16 having the mesh screen fitted thereto.
Figure 18:
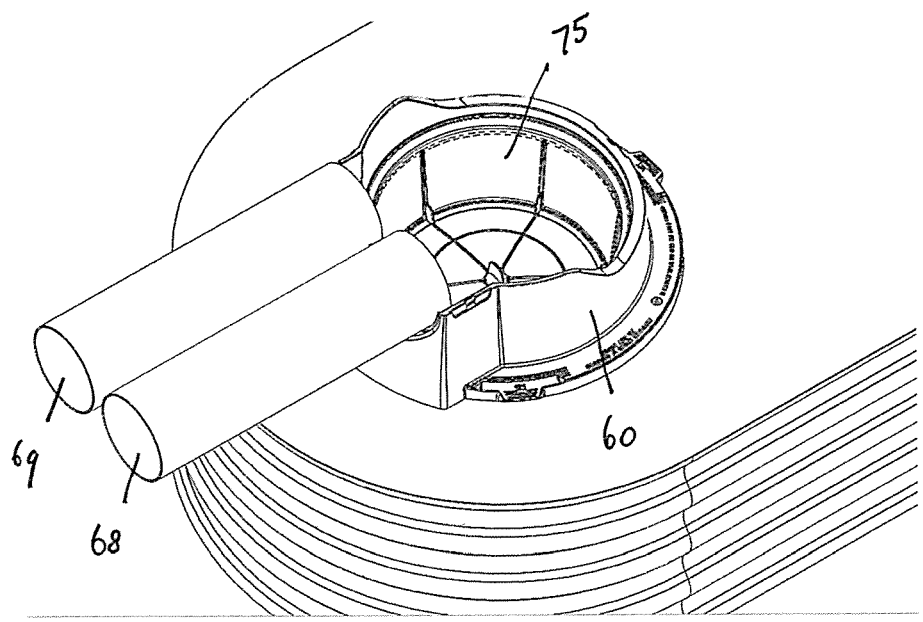
FIG. 18 is a perspective view of the mounting base shown in FIG. 17 having the water delivery pipes shown in position.

FIG. 17 shows the mesh screen 65 being fitted into the mounting base 60. Once the mesh screen 75 has been inserted, pipes 68, 69 can be placed in the respective recesses 70, 71 of the mounting base 60. This is shown in FIG. 18.

Figure 19:
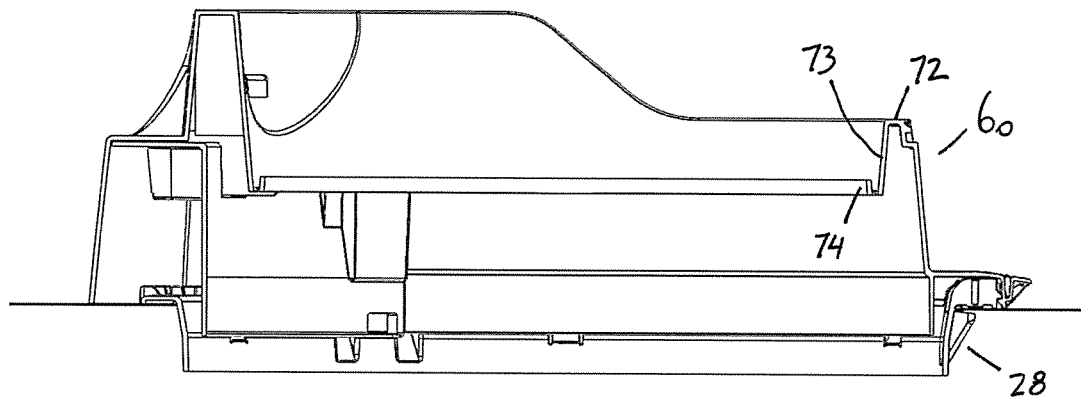
FIG. 19 is a cross sectional view of the mounting base being shown mounted to a tank fitting that, in turn, is mounted to the inlet of a water tank.

FIG. 19 shows the mounting base 60 mounted to a tank fitting 28. As mentioned earlier, the mounting base 60 may be mounted to the tank fitting 28 in the same manner as the tank screen 10 is mounted to the tank fitting 28 in the embodiment shown in FIGS. 1 to 14. In other variations of the embodiment shown in FIGS. 15 to 25, the tank fitting 28 may be omitted and the mounting base 60 may simply be inserted into the inlet of the tank opening. The mounting base could simply sit in the tank inlet, or it could be affixed to the tank in that using fasteners, such as screws, clips or the like, or it could screw into the tank inlet.

Figure 20:
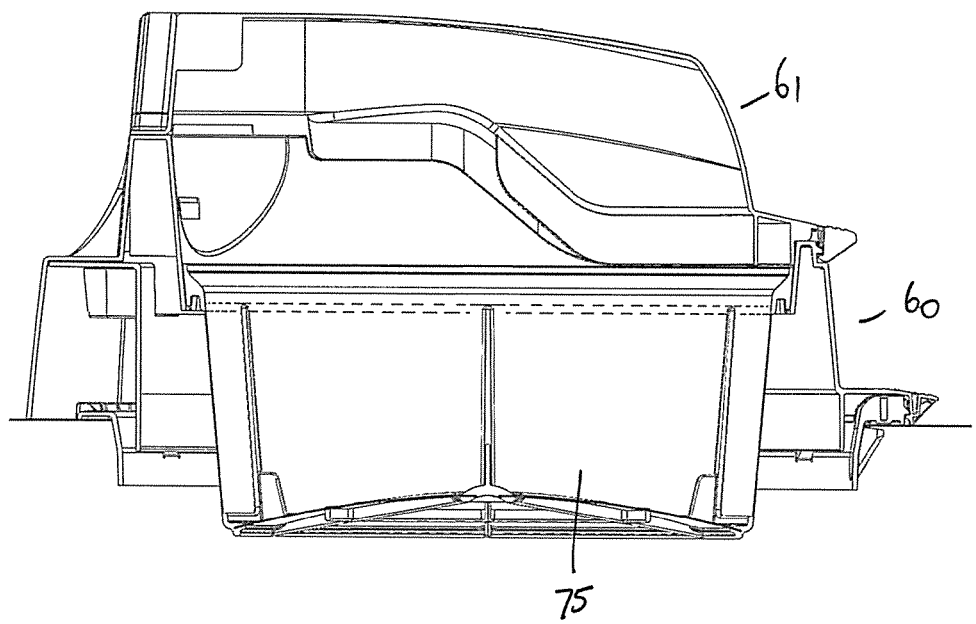
FIG. 20 is a cross-sectional view showing the mounting base shown in FIG. 19 having the mesh screen and hood fitted thereto.
Figure 21:
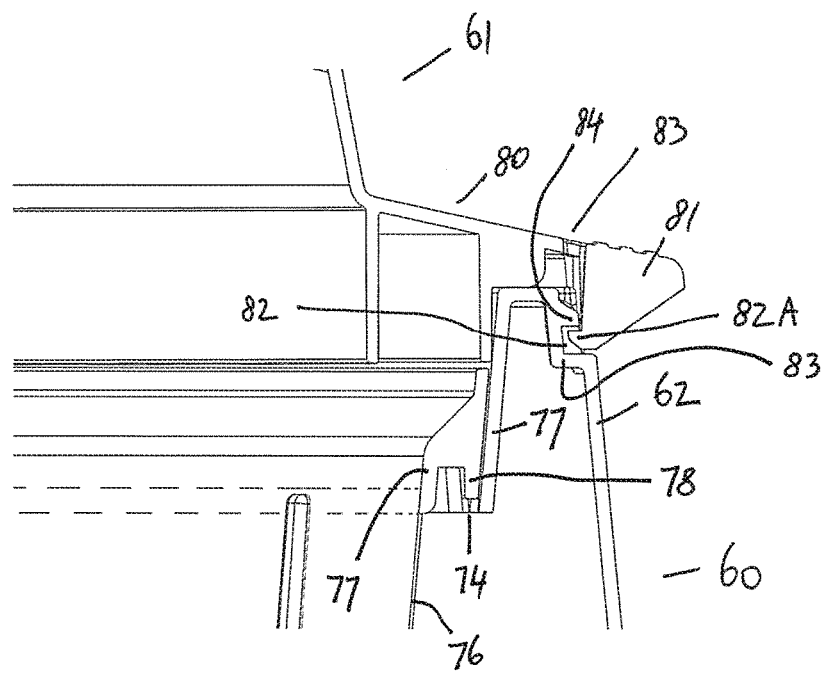
FIG. 21 is an enlarged view showing the connection between the hood and the mounting base shown in FIG. 20.

FIG. 20 shows the mounting base 60 fitted with the mesh screen 75 and having the hood 61 connected thereto. Further detail of the hood 61 being connected to the mounting base 60 can be seen in FIG. 21. In particular, the hood 61 has a flange 80 that carries a boss or a tab 81. Boss or tab 81 has a projection 82A that has a ramped lower surface. The upper part of the solid side wall 62 of mounting base 60 has an inwardly extending recess 82 that is defined by opposed shoulders 83 and 84. Shoulder 84 has a ramped upper surface. When the hood 61 is placed on the mounting base 60, the user pushes down on the front part of the hood 61. The ramped surface of projection 82A contacts the ramped surface of shoulder 84. As boss or tab 81 is connected to flange 80 by flexible region 83, the boss or tab 81 flexes outwardly until the upper surface of projection 82A is lower than the lower surface of shoulder 84. At this time, the projection 82A snaps inwardly and the projection 82A becomes trapped in recess 82. The rear part of the hood 61 is also provided with projections 84 that can be moved inwardly and outwardly by flexible tabs 85. The projections 84 can enter into suitable recesses, one of which is shown at 86 in FIG. 17, that are formed in the rear part of the mounting base 60 so that the rear part of the hood can also snap fit to the rear part of the mounting base. This firmly mounts the hood to the mounting base.

Figure 22:
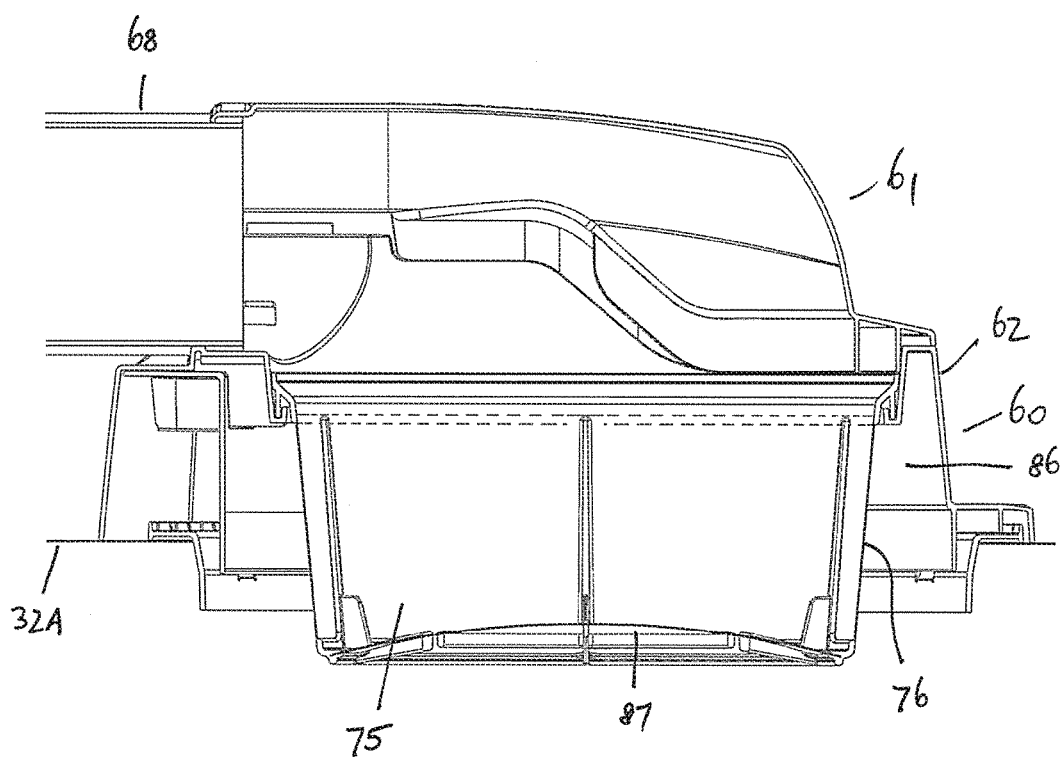
FIG. 22 is a cross-sectional view of the assembly shown in FIG. 20 with the water pipes being positioned in place.

As there shown in FIG. 22, the ends of pipes 68, 69 are positioned so that they are clear of the mesh screen 75. This enables the mess screen 75 to be easily cleaned by removing the hood 61 by operation of the appropriate tabs to open the snap fitting connections, followed by simply lifting up the mess screen 75, as shown in FIG. 23. Once the mesh screen 75 has been cleaned, for example, by removing leaves therefrom, the mesh screen 75 can simply be lowered back into place so that it hangs on the hanging lip 74. The hood 61 can then be re-positioned and snapped fitted into place. Therefore, cleaning and maintenance of the tank screen assembly is simplified.

FIG. 22 shows a cross-sectional side view of the completed tank screen assembly of the embodiment shown in FIGS. 15 to 25. As can be seen from FIG. 22, the roof of the hood 61 provides a splash shield so that any water splashing upwardly out of the pipes 68, 69 hits the roof of the hood 61 and falls downwardly into the mess screen 75. There is a space 86 provided between the solid side wall 62 of the mounting base 60 and the mesh sidewall 76 of the mesh screen 75. If the mesh base 87 of the mess screen 75 becomes blocked by leaves, water can still flow through the mesh sidewall 76 and into the tank. FIG. 22 also shows the tank roof 32A. As can be seen, the upper part of the mesh screen 75 is located above the level of the tank roof 32A.

Figure 25:
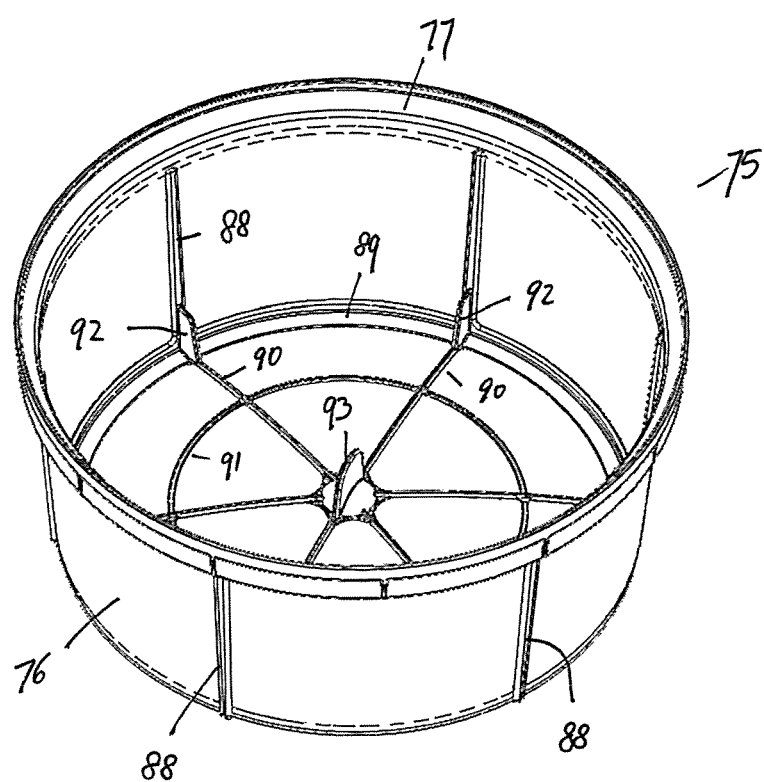
FIG. 25 is a perspective view of the mesh screen that can be used in the embodiment shown in FIGS. 15 to 24.

FIG. 25 shows a perspective view of the mesh screen 75 used in the embodiments of the present invention shown in FIGS. 15 to 25. The mesh screen 75 is of generally inverted frusto-conical shape or generally cylindrical shape and it has an open top. The open top is defined by a plastic ring 77. The mesh sidewall 76 is attached to or formed with the plastic ring 77. A plurality of reinforcing ribs 88 extend downwardly from the plastic ring 77 to provide strength to the mesh sidewall 76. A lower plastic ring 89 bounds the lower edge of the mesh sidewall 76. A plurality of radial reinforcing ribs 90 extend inwardly from the reinforcing ribs 88 and lower ring 89. One or more circumferential reinforcing ribs 91 are also provided so that the base of the mesh screen has sufficient strength. Reinforcing gussets 92 may also be provided. The centre of the base has an upwardly extending projection 93 that can be grasped by the user to assist in lifting the mesh screen 75 out of the mounting base 60. Mesh is fitted over the ribs 90, 91 to form the mesh base 87 of the mesh screen 75.

The present invention use a combination of a mesh screen having a mesh sidewall that has an upper part that finishes above the level of the roof tank in combination with a solid sidewall that provides a splash guard that directs water flowing through the mesh screen into the storage compartment of the water tank. Although the figures show embodiments of the present invention in which the mesh base of the mesh screen is located below the level of the roof of the tank, it will be appreciated that embodiments may be provided in which the mesh base is located at or even above the level of the roof of the water tank. For example, in the embodiment shown in FIG. 22, the solid sidewall 62 of the mounting base 60 may simply be lengthened to make the solid wall 62 longer/higher whilst keeping all other dimensions of the other components the same. This will act to raise the level of the mesh screen 75 and the level of the mesh screen 75 may be raised to such an extent that the mesh base 87 is located at or above the level of the roof of the tank. However, it will be understood that the most efficient use of materials will be obtained by having the solid sidewall of the tank screen being kept to a minimum acceptable length/height and this would typically dictate that the mesh base of the mesh screen would be located below the level of the roof of the tank. The dimensions of the tank screen in accordance with the present invention should be such that the base of the mesh screen is located above a maximum water level in the tank. It will be understood that the maximum level in the tank is set by the height of the overflow pipe in the tank and the base of the mesh screen should be above that level.

It will be appreciated that the product can be made in different sizes to suit different tank inlet sizes—typically these can be nominal sizes of 300 mm, 400 mm, and 500 mm. Typical dimensions of the product suitable for use with a tank having an inlet of 400 mm diameter in this case is: Overall Diameter—420 mm×Overall height 145 mm (or 265 mm with the cover on). In some embodiments, the bottom of the mesh screen is located at a distance below the top of the tank that is less than a distance below the top of the tank of the lower part of the overflow pipe of the tank, it being appreciated that the lower part of the overflow pipe effectively sets the maximum water level in the tank.

Throughout the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A tank inlet screen for placement spanning an inlet of a tank, for filtering leaves and other detritus from water entering the tank, the tank inlet screen comprising:
   an upwardly extending solid sidewall (16);
   a mesh screen (18) having an interior volume defined by a surrounding mesh sidewall (20) extending downwardly from an upper portion of the solid sidewall (16), and a mesh base (22) attached to a lower portion of the mesh sidewall (20), an upper portion of the mesh sidewall is at least partly enclosed by the solid sidewall (16);
   a flange (12) laterally extending from the solid sidewall (16);
   a peripheral skirt (14) extending downwardly from an outermost portion of the flange (12) defining at least one contact surface; and
   an inner wall (12A) extending downwardly from a bottom side of flange (12).

2. The tank inlet screen as recited in claim 1, wherein the solid sidewall (16) is capable of directing water passing through the mesh sidewall (20) into the tank and acting as a splash shield to minimize loss of water.

3. The tank inlet screen as recited in claim 1, wherein the mesh base (22) is positioned at a level below the at least one contact surface, or the lower portion of the mesh sidewall (20) is positioned below a level of the at least one contact surface, or the mesh base (22) is positioned at a level at or above the at least one contact surface.

4. The tank inlet screen as recited in claim 1, wherein the mesh base (22) is positioned at a level that is above a maximum water level in the tank.

5. The tank inlet screen as recited in claim 1, wherein the at least one contact surface contacts an upper surface of a roof of the tank surrounding the tank inlet when the tank inlet screen is installed.

6. The tank inlet screen as recited in claim 1, wherein a space is defined between the mesh sidewall (20) and the solid sidewall (16).

7. The tank inlet screen as recited in claim 1, wherein the upwardly extending solid sidewall (16) extends inwardly in a frustoconical shape.

8. The tank inlet screen as recited in claim 1, wherein the mesh sidewall (20) which extends downwardly from the upper portion of the solid sidewall (16), also extends inwardly in an inverted frustoconical shape.

9. The tank inlet screen as recited in claim 1, further comprising:
   a hood or lid having one or more openings for receiving a pipe or pipes that deliver(s) rainwater to the tank.

10. The tank inlet screen as recited in claim 1, wherein the mesh screen (18) is reinforced or strengthened by one or more reinforcements, or reinforcement ribs or reinforcement struts.

11. The tank inlet screen as recited in claim 1, wherein the mesh screen (18) is removable.

12. The tank inlet screen as recited in claim 1, wherein the upper portion of the solid sidewall (16) includes an inwardly extending flange upon which an outwardly extending flange of the mesh sidewall (20) sits or rests.

13. The tank inlet screen as recited in claim 1, wherein the tank inlet screen is made as an integral unit.

14. The tank inlet screen as recited in claim 1, wherein the tank inlet screen comprises a plurality of individual parts.

* * * * *